United States Patent
Buuck et al.

(10) Patent No.: US 9,128,523 B2
(45) Date of Patent: Sep. 8, 2015

(54) DYNAMICALLY GENERATING HAPTIC EFFECTS FROM AUDIO DATA

(71) Applicant: Amazon Technologies, Inc., Reno, NV (US)

(72) Inventors: David Charles Buuck, Prunedale, CA (US); Tiffany Ann Yun, Fremont, CA (US); John Aaron Zarraga, San Francisco, CA (US)

(73) Assignee: Amazon Technologies, Inc., Reno, NV (US)

( * ) Notice: Subject to any disclaimer, the term of this patent is extended or adjusted under 35 U.S.C. 154(b) by 365 days.

(21) Appl. No.: 13/722,435

(22) Filed: Dec. 20, 2012

(65) Prior Publication Data

US 2014/0176415 A1    Jun. 26, 2014

(51) Int. Cl.
*H04R 29/00*   (2006.01)
*G06F 3/01*    (2006.01)

(52) U.S. Cl.
CPC ..................... *G06F 3/016* (2013.01)

(58) Field of Classification Search
USPC .............. 345/156, 173; 340/407.1; 463/30; 381/56, 61, 98, 111, 161, 162, 301, 381/333, 388; 700/94
See application file for complete search history.

(56) References Cited

U.S. PATENT DOCUMENTS

| | | | |
|---|---|---|---|
| 2007/0236449 A1 | 10/2007 | Lacroix et al. | |
| 2012/0200520 A1 | 8/2012 | Harris | |
| 2012/0206247 A1 | 8/2012 | Bhatia et al. | |
| 2013/0307468 A1 * | 11/2013 | Lee et al. | 320/108 |

OTHER PUBLICATIONS

Young, "Patent Cooperation Treaty International Search Report and Written Opinion dated May 23, 2014", Patent Cooperation Treaty Application No. PCT/US13/75269, Patent Cooperation Treaty, May 23, 2014.

* cited by examiner

*Primary Examiner* — Vivian Chin
*Assistant Examiner* — Friedrich W Fahnert
(74) *Attorney, Agent, or Firm* — Lindauer Law, PLLC

(57) ABSTRACT

Haptic effects are dynamically generated for content presentation on a device through analysis of the content. During content playback, audio data for the content may be analyzed to determine low frequency audio data. The low frequency audio data is mapped from a low frequency range to a haptic control frequency range of one or more haptic actuators included in the device. This mapping may be used to generate a control signal to drive the one or more haptic actuators. The haptic effects and the content may be synchronized to one another during the presentation of the content on the device. The haptic actuator control signal may be amplified proportionally to the amplitude of the low frequency audio data.

20 Claims, 15 Drawing Sheets

DYNAMICALLY GENERATING HAPTIC EFFECTS FROM AUDIO DATA

BACKGROUND

Traditionally, users have consumed media through home entertainment devices, with each device dedicated to a particular type of media. For example, users may play a game on a dedicated game console, listen to audio on a home stereo system, or watch a movie on a home theater system. With the increasing popularity of mobile devices such as smartphones, tablet computers, and so forth, more users are consuming media through their mobile devices. Unfortunately, a user's experience when consuming media on a mobile device may not be as rich as the experience when consuming media on a traditional system, due to limited capabilities of the mobile device.

Figure 1:
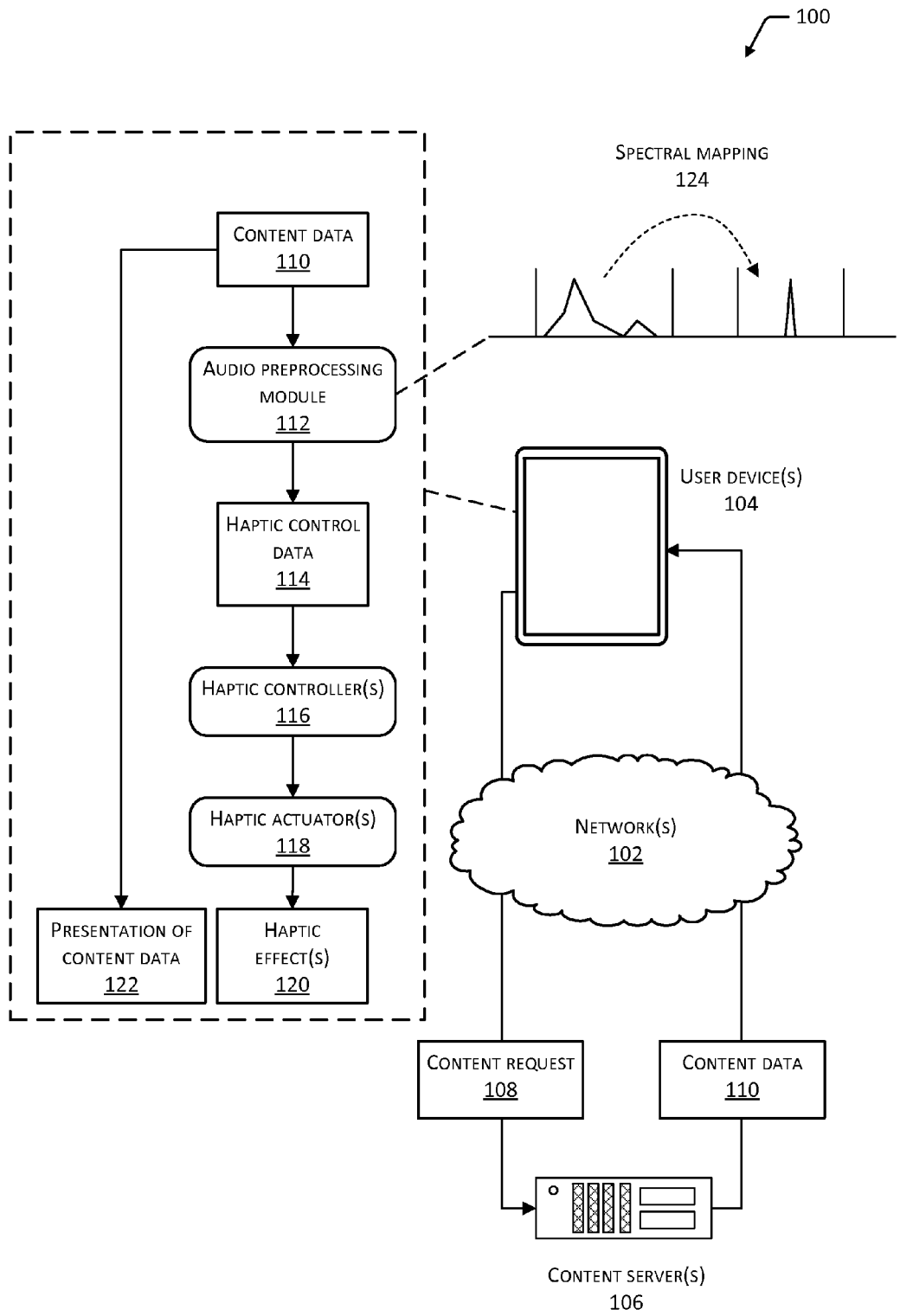
FIG. 1 depicts an environment for dynamically generating haptic effects on a user device by analyzing audio data received by the user device.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure describes embodiments of systems, methods, and computer-readable media for generating haptic effects to be provided during a presentation of content. The presentation may be on computing devices (e.g., user devices), including fixed devices or mobile devices, such as tablet computers, media player devices, smartphones, in-vehicle entertainment systems, home theater systems, public theater systems, and so forth. In implementations, the haptic effects are generated by analyzing audio data associated with the content and extracting low frequency audio data from one or more audio channels associated with the content. In some implementations, this analysis is performed dynamically on a user device as the content is received, and the haptic effects are provided to a user during the presentation of the content (e.g., during video or audio playback). By generating haptic effects during presentation of the content, implementations enable a user experience that is richer, more visceral, or more realistic than the user would otherwise experience without the added haptic effects.

As used herein, haptic effects refer to effects that are presented to a user as tactile feedback while the user is interacting with a device. Haptic effects include forces, vibrations, motions, or sensations that are perceivable by the user through mechanoreceptor nerves of the human nervous system. As used herein, content refers to media content including audio, video, games, graphics, multimedia content, or other types of content that may be presented on a computing device.

In some implementations, content is analyzed on a user device during or prior to presentation of the content on the user device. In some cases, the analysis may be performed dynamically or on-the-fly while the content is being streamed or downloaded from a content server. The analysis may also be performed on a content file that has been previously downloaded to and stored in memory on the user device. In some implementations, one or more audio portions (e.g., audio channels) of the content are identified, and low frequency audio data is extracted from the content. As used herein, low frequency audio data includes audio data for low-pitched sounds, within a low frequency audio range. In some cases, the low frequency audio data includes low frequency effects (LFE) audio data that corresponds to one or more audio tracks designed to be played on a subwoofer of an audio playback system. Various audio frequency ranges may be used to identify the low frequency audio data. For example, audio data having a frequency between 20 Hertz (Hz) and 80 Hz may be identified as low frequency audio data. As another example, audio data having a frequency between 3 Hz and 120 Hz may be identified as low frequency audio data. Extraction of the low frequency audio data is described further herein with reference to FIG. 5.

Implementations may determine haptic control data based on the extracted low frequency audio data. This determination of haptic control data may be described as a spectral mapping operation, which receives as input the low frequency audio data in the low frequency audio range (e.g., 20-80 Hz). This data is mapped to generate as output the haptic control data in a haptic control frequency range for haptic actuators. As used herein, a haptic actuator refers to a device or device component that outputs haptic effects that may be perceived by a user as a vibration, motion, or sensation. In some implementations, haptic actuators may not include devices or device components that have a conventional purpose to generate sound, such as a speaker. Haptic actuators may receive a haptic control signal in a particular control frequency range and generate haptic effects in response to the control signal. Various types of haptic actuators may have varying control frequency ranges. For example, some haptic actuators may respond to control signals in the 100-500 Hz range.

Implementations support various types of spectral mapping operations to generate the haptic control data, which is provided as a control signal to one or more haptic actuators in a device. In some implementations, the mapping operation generates a haptic control signal at a resonant frequency of the haptic actuator(s) in the device, based on low frequency audio data that is above a threshold amplitude. Such implementations are described in further detail with reference to FIGS. 6 and 7.

In some implementations, the mapping operation is a functional mapping operation that maps the input low frequency audio data to the output haptic control data through operation of a function. Implementations support any type of mapping function. In some cases, the function may be a linear function. Such implementations are described in further detail with reference to FIGS. 8 and 9.

In some implementations, the mapping operation includes dividing the low frequency audio range into a number of frequency bins (e.g., sub-ranges), dividing the haptic control frequency range into a number of frequency bins, and mapping data from the low frequency audio range bins to the haptic control frequency range bins. In some cases, the binwise mapping may employ a Fast Fourier Transform (FFT) or other algorithm. Such implementations are described in further detail with reference to FIGS. 10 and 11.

In some implementations, generation of haptic control data may be performed on a content server or other service device prior to providing the content to a user device. In such cases, the haptic control data may be provided to the user device as a separate channel in the content file, or as a separate file or separate data stream in addition to the content file. Such implementations are described in further detail with reference to FIGS. 12 and 13.

FIG. 1 shows an example environment 100 in which various implementations of haptic effects generation may operate. In implementations, the various devices and modules of the environment 100 may communicate with one another and with external devices via one or more networks 102. Such networks 102 may include public networks such as the Internet, private networks such as an institutional or personal intranet, or some combination of private and public networks. The networks 102 may also include any type of wired or wireless network, including, but not limited to, local area networks (LANs), wide area networks (WANs), Wi-Fi™, WiMax, and mobile communications networks (e.g. 3G, 4G, and so forth). The networks 102 may utilize communications protocols, including packet-based or datagram-based protocols such as Internet Protocol (IP), Transmission Control Protocol (TCP), User Datagram Protocol (UDP), or other types of protocols.

In some implementations, the environment 100 includes one or more user devices 104 that are owned by, operated by, or otherwise associated with one or more users. The user device(s) 104 may include any type of computing device that is able to communicate with other devices over the networks 102. The user device(s) 104 may include, but are not limited to, desktop computers, personal computers, laptop computers, tablet computers, electronic book readers, wearable computers, implanted computers, mobile phones, thin clients, terminals, game consoles, mobile gaming devices, and the like. In some implementations, the user device(s) 104 include one or more applications that provide a user interface to connect with a remotely hosted service to stream or otherwise receive content. For example, the user device(s) 104 may run a web browser, media player, or other application to enable users to interact with a content server to browse content and select content for presentation on the user device(s) 104. The user device(s) 104 are described further herein with reference to FIG. 2.

In some implementations, the environment 100 includes one or more server computing devices. Such servers may include any type of computing device including, but not limited to, network servers, rack-mounted servers, workstations, desktop computers, laptop computers, tablet computers, mobile computing devices, virtual servers, cloud resources, and the like. Further, the servers shown may include one or more computing devices that operate in a cluster or other grouped configuration to share resources, balance load, increase performance, provide fail-over support or redundancy, or for other purposes. The servers may also include one or more hardware modules and one or more software modules (e.g., processes or applications) to perform tasks as described herein.

As shown in FIG. 1, the environment 100 includes one or more content servers 106. In some implementations, the content server(s) 106 store content or are configured to access content stored on another device. The content server(s) 106 may also be configured to serve content requested by users of the user device(s) 104. In some cases, the content server(s) 106 may provide a user interface to enable a user of the user device(s) 104 to browse available content and select one or more items of content to be streamed to, downloaded to, or otherwise presented on the user device(s) 104. The content server(s) 106 are described further herein with reference to FIG. 3.

In some implementations, a content request 108 may be sent from the user device(s) 104 to the content server(s) 106, to request one or more items of content to be provided to the user device(s) 104. In response to the content request 108, content data 110 may be provided to the user device(s) 104. The content data 110 may be provided in a file that is downloaded or transferred to the user device(s) 104, or as a content stream to the user device(s) 104.

The content data 110 may include one or more content items that include audio information. For example, the content data 110 may include audio files such as music files, audiobooks, audio podcasts, voice messages, or any other type of audio recording. The content data 110 may also include multimedia content such as video, including films, television, video podcasts, video messages, or any other type of video recording. The content data 110 may also include games with audio content.

After receiving the content data 110, or while receiving the content data 110, one or more modules on the user device(s) 104 may perform operations to analyze the audio portion(s) of the content data 110 and generate a control signal for haptic effects. In implementations, the content data 110 may be provided to an audio preprocessing module 112 on the user device(s) 104. The audio preprocessing module 112 may include a software module executing in memory on the user device(s) 104, a hardware module incorporated in the user device(s) 104, or any combination of hardware and software modules. The audio preprocessing module 112 may extract the low frequency audio data from one or more audio portions of the content data 110 and use the low frequency audio data to generate haptic control data 114. The haptic control data 114 may then be provided to one or more haptic controllers 116. The haptic controller(s) 116 may then provide the haptic control data 114 as a control signal to drive one or more haptic actuators 118 to generate one or more haptic effects 120 during a presentation 122 of the content data 110 on the user device(s) 104.

In some implementations, the audio preprocessing module 112 performs operations for a spectral mapping 124. The spectral mapping 124 accepts as input the low frequency audio data and generates as output the haptic control data 114, by mapping the low frequency audio data from a low frequency audio range (e.g., 20-80 Hz) to a control frequency range (e.g., 100-500 Hz) of the haptic actuator(s) 118. Such operations are described further with reference to FIGS. 4-11.

In some implementations, the haptic effects 120 are generated during the presentation 122 of the content data 110 to provide a more visceral or realistic experience for the user. In some cases, the haptic effect 120 may be substantially synchronized with the presentation 122 of the content data 110. For example, in cases where the content data 110 is a film, television program, or game, the added haptic effect(s) 120 may add a sense of realism to events portrayed in the content data 110.

Synchronization of the content presentation 122 of the content data 110 to the haptic effect(s) 120 may also create a richer listening experience for the user when the content data 110 is audio data such as music. In some cases, user devices 104 such as mobile devices may not have speakers with the ability to play low frequency audio data, such as a subwoofer. Implementations allow the conventional speakers of a user device 104 to be supplemented with the haptic actuator(s) 118, so that the low frequency audio data may be presented to the user through haptic actuator(s) 118 instead of going unpresented.

Figure 2:
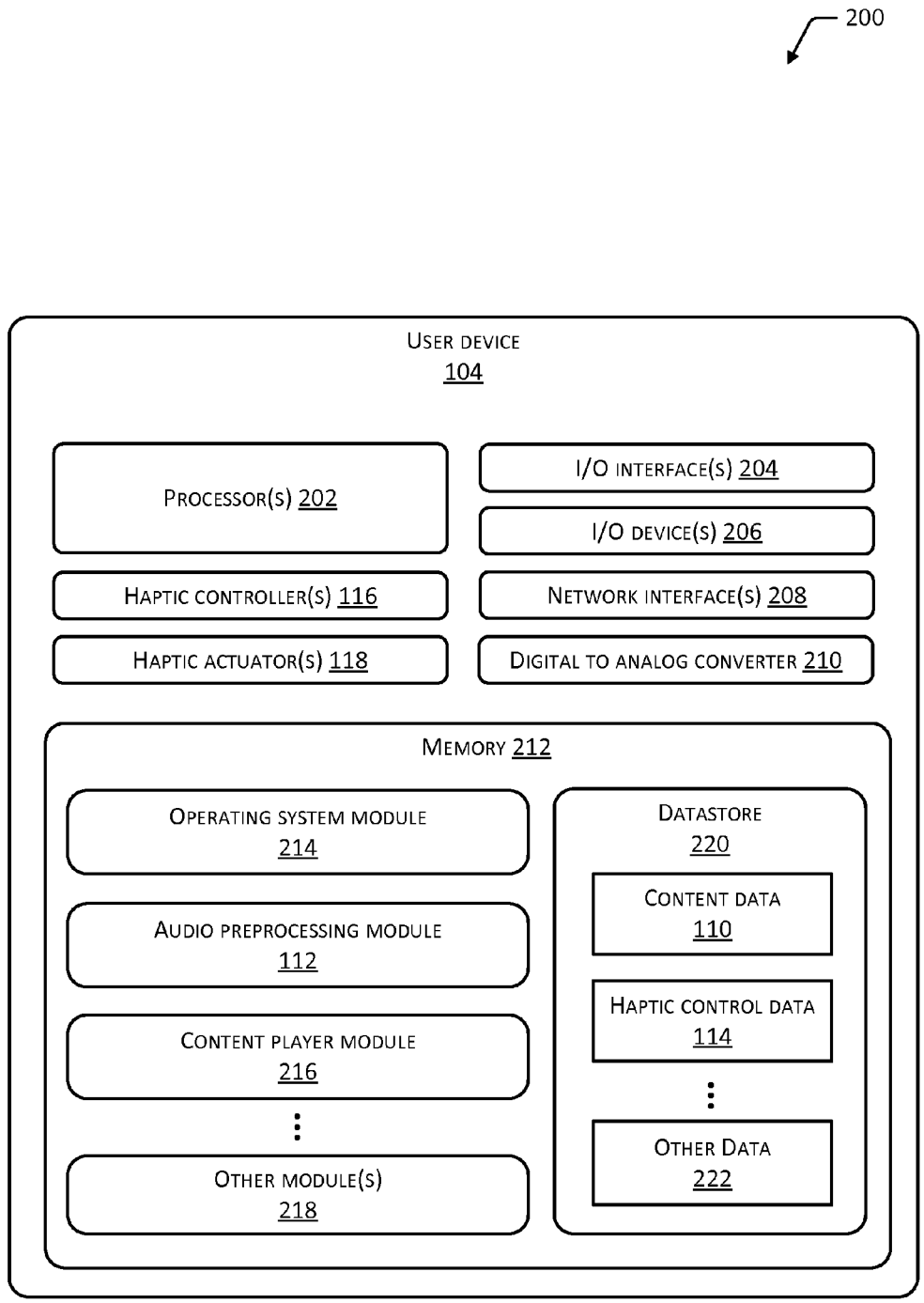
FIG. 2 depicts a block diagram of a user device configured to perform operations for generating haptic effects.

FIG. 2 depicts a block diagram 200 of an example user device 104 that may be used in implementations described herein. The user device 104 may include one or more processors 202 configured to execute one or more stored instructions. The processor(s) 202 may comprise one or more cores. In some implementations, the processor(s) 202 may include an audio processor, a video processor, a digital signal processor (DSP), or a graphics processing unit (GPU) that performs operations to analyze, generate, or alter audio data as described herein. In some implementations, multiple components of the user device 104 may be on a same die, as in a system-on-a-chip (SoC) or a field-programmable gate array (FPGA).

The user device 104 may include one or more input/output (I/O) interfaces 204 to allow the user device 104 to communicate with other devices. The I/O interface(s) 204 may enable information to be transferred in or out of the user device 104 through serial communication, parallel communication, or both serial and parallel communications. For example, the I/O interface(s) 204 may comply with the RS-232 standard for serial ports, or with the Institute of Electrical and Electronics Engineers (IEEE) 1284 standard for parallel ports. As another example, the I/O interface(s) 204 may be configured to provide a Universal Serial Bus (USB) connection compliant with the standards promulgated by the USB Implementers Forum, Inc. of Beaverton, Oreg.

The I/O interface(s) 204 may couple to one or more I/O devices 206. The I/O device(s) 206 may include user input devices such as one or more of a keyboard, a mouse, a pen, a game controller, a voice input device, a touch input device, a gestural input device, other devices shown in FIGS. 1 and 12, and so forth. The I/O device(s) 206 may include output devices such as one or more of a display, a printer, audio speakers, and so forth. In some implementations, the I/O device(s) 206 may be physically incorporated with the user device 104 or may be externally placed.

Figure 12:
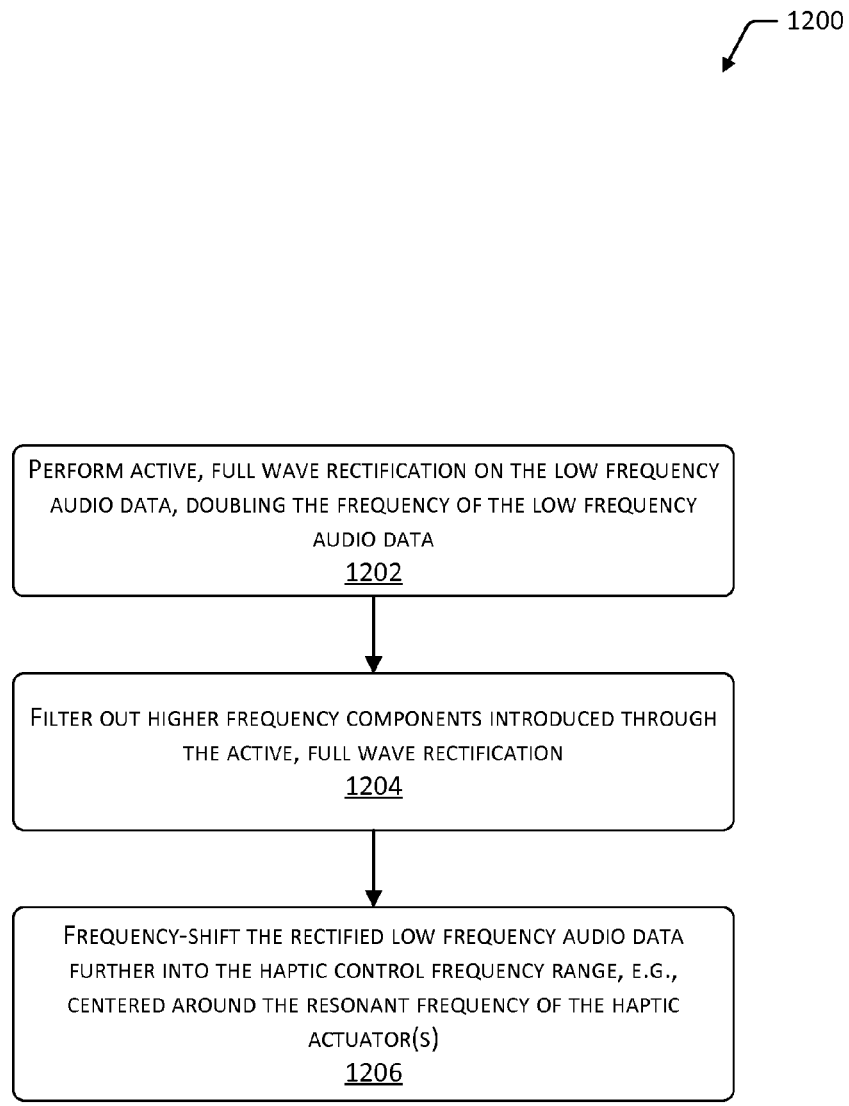
FIG. 12 depicts a flow diagram of a process for generating a haptic control signal to be employed to generate haptic effects based on low frequency audio data.

The user device 104 may also include one or more network interfaces 208 to enable communications between the user device 104 and other networked devices such as those depicted in FIGS. 1 and 12. Such network interface(s) 208 may include one or more network interface controllers (NICs) or other types of transceiver devices configured to send and receive communications over the network(s) 102. The user device 104 may also include one or more busses or other internal communications hardware or software that allow for the transfer of data between the various modules and components of the user device 104.

In some implementations, the user device 104 may include the haptic controller(s) 116. The haptic controller(s) 116 may be incorporated into the user device 104, as an integrated circuit or a SoC. The haptic controller(s) 116 may be on a separate die from the processor(s) 202 or may be on a same die as the processor(s) 202. In some implementations, the haptic controller(s) 116 may be incorporated into one or more audio processing units included in the user device 104. In some cases, the haptic controller(s) 116 may be external to the user device 104 and in communication with the user device 104 through the I/O interface(s) 204 or the network interface(s) 208.

In some implementations, the haptic controller(s) 116 may receive the haptic control data 114 and may be configured to drive or control the haptic actuator(s) 118 by providing the haptic control data 114 as a control signal to the haptic actuator(s) 118. In some implementations, the haptic controller(s) 116 may perform power amplification on the haptic control data 114 before providing it to the haptic actuator(s) 118. In some implementations, the user device 104 may include a digital to analog converter (DAC) 210. In cases where the haptic controller(s) 116 accept analog haptic control data 114 as input, the DAC 210 may convert digital haptic control data 114 to analog data before the haptic control data 114 is provided to the haptic controller(s) 116.

Implementations support any type of the haptic actuator(s) 118, using any type of haptic effects generating technology. In some implementations, the haptic actuator(s) 118 employ a unified mass or inertial mode excitation technology, which employ a mass that is suspended in a cavity of the user device 104. The mass may be accelerated or decelerated to create a pulsive force that is perceivable to the user as a vibration of the user device 104. The acceleration or deceleration may be in an X-Y plane of a surface of the user device 104 (e.g., in a shear direction) or in a Z-direction orthogonal to an X-Y plane. Because force in a Z-direction may generate audible noise through compression of air inside or outside the user device 104, some implementations may employ haptic actuator(s) 118 that generate force in a shear direction using a vibrotactile shear mode excitation technology.

The haptic actuator(s) 118 may also employ other methods for generating haptic effects, including coefficient of friction modulation actuators, electroactive polymer actuators, electrostatic repulsion actuators, haptic actuators based on piezoelectric materials, or other haptic effect generation technologies.

The various types of haptic actuator(s) 118 may have a response curve that determines how the haptic actuator 118 responds to input control signals at various frequencies. In some cases, a haptic actuator 118 may have a response curve that peaks at a particular resonant or center frequency, such that the haptic effect generated by the actuator has a higher amplitude when the haptic actuator 118 is driven by a control signal that is at or near its resonant or center frequency. In some cases, the response of the haptic actuator 118 may fall off as the control signal varies from the resonant or center frequency, as characterized by a Q factor of the actuator. For example, haptic actuators 118 having a high Q factor may have a response curve that peaks at the resonant or center frequency, and falls off rapidly as the control signal deviates from the resonant or center frequency. Haptic actuators 118 having a lower Q factor may have a flatter response curve, such that the amplitude of the haptic effect is flatter across a greater portion of the haptic control frequency range of the haptic actuator 118. Implementations may employ haptic actuator(s) 118 with various Q factors and response characteristics.

As shown in FIG. 2, the user device 104 includes one or more memories, described herein as memory 212. The memory 212 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 212 provides storage of computer readable instructions, data structures, program modules, and other data for the operation of the user device 104.

The memory 212 may include at least one operating system (OS) module 214. The OS module 214 is configured to manage hardware resources such as the I/O interface(s) 204 and provide various services to applications or modules executing on the processor(s) 202.

In some implementations, the OS module 214 may comprise a distribution or variant of the Linux® operating system originally released by Linus Torvalds. The OS module 214 may implement one or more of the following: any version of the Linux® operating system originally released by Linus Torvalds; any version of iOS from Apple Corp. of Cupertino, Calif., USA ; any version of Windows® or Windows Mobile® from Microsoft Corp. of Redmond, Wash., USA; any version of Android® from Google, Corp. of Mountain View, Calif., USA, and its derivatives from various sources; any version of Palm OS® from Palm Computing, Inc. of Sunnyvale, Calif., USA, and its derivatives from various sources; any version of BlackBerry OS® from Research In Motion Ltd. of Waterloo, Ontario, Canada; or other operating systems such as VxWorks from Wind River Systems of Alameda, Calif., USA.

In the example shown, the memory 212 includes an audio preprocessing module 112. In some implementations, the audio preprocessing module 112 is a software module performing operations to analyze audio information included in the content data 110, extract low frequency audio data, and generate the haptic control data 114 to control the haptic actuator(s) 118. In some implementations, one or more of such operations may be performed by firmware or circuitry of the haptic controller(s) 116 or by one or more dedicated audio processors, video processors, or GPUs included in the processor(s) 202.

In some implementations, the user device 104 may also include a content player module 216, such as an audio playback application or a video playback application, executed on the user device 104 to present the content data 110 on one or more of the I/O device(s) 206 or to devices attached to the I/O interface(s) 204 or the network interface(s) 208.

Other modules 218 may also be included in the memory 212. These other modules 218 may include, but are not limited to, user authentication modules, access control modules, digital rights management modules, stored content management modules, and so forth.

In some implementations, the memory 212 also includes a datastore 220 to store information for operations of the user device 104. The datastore 220 may comprise a database, array, structured list, tree, or other data structure. The datastore 220 may store the content data 110 and the haptic control data 114. The datastore 220 may also store other data 222, such as user account or authentication information, digital rights management data, and so forth.

Figure 3:
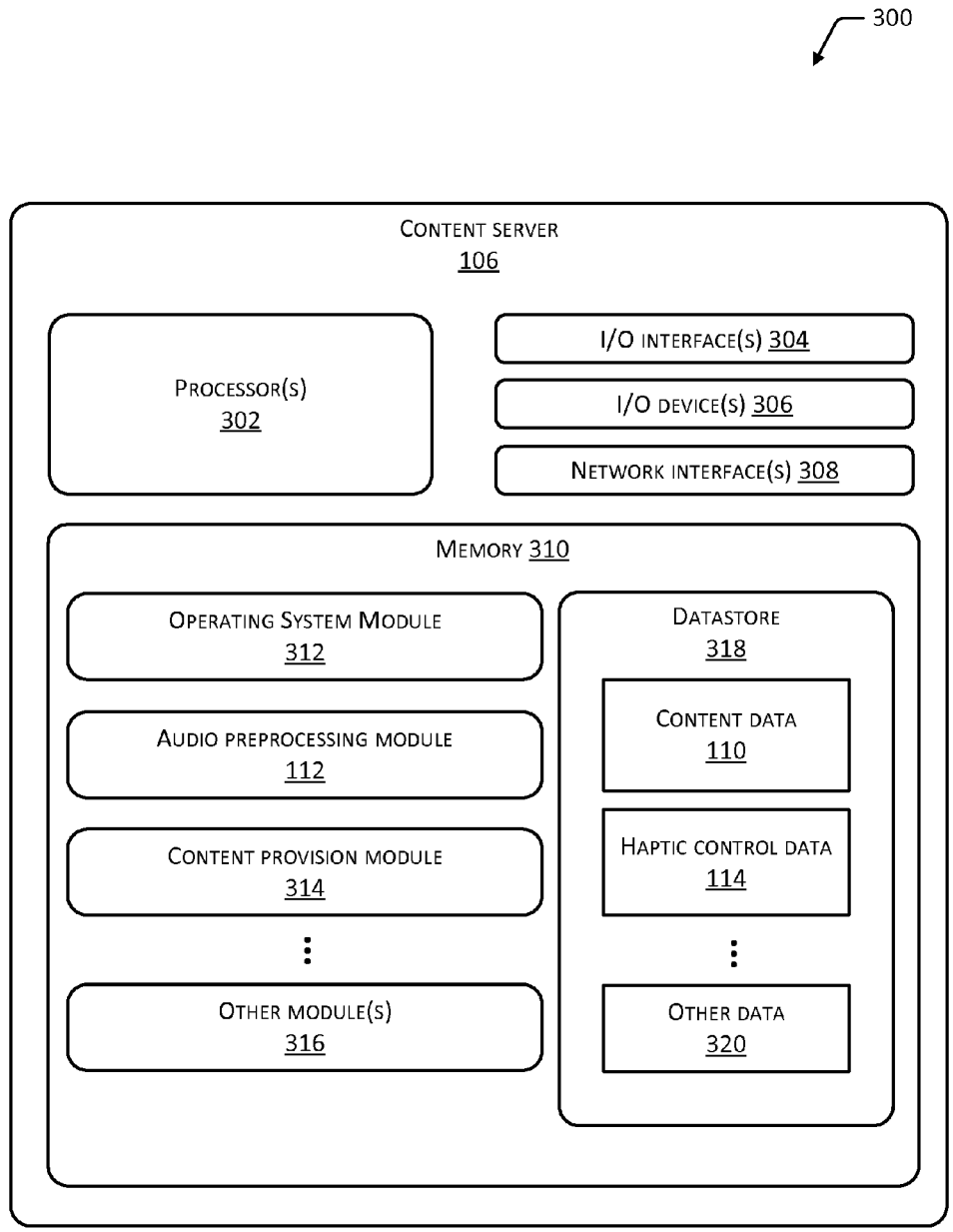
FIG. 3 depicts a block diagram of a content server device configured to perform operations for generating haptic effects.

FIG. 3 depicts a block diagram 300 of a content server 106 that may be used in implementations described herein. The content server 106 may include one or more processors 302 configured to execute one or more stored instructions. The processor(s) 302 may comprise one or more cores.

As described with regard to the user device 104, the content server 106 may include one or more I/O interfaces 304 to allow the content server 106 to communicate with other devices such as those shown in FIGS. 1 and 12. The I/O interface(s) 304 may couple to one or more I/O devices 306. The I/O device(s) 306 may include user input devices such as one or more of a keyboard, a mouse, a pen, a game controller, a voice input device, a touch input device, a gestural input device, one or more accelerometers, one or more gyroscopes, other devices in FIGS. 1 and 12, and so forth. The I/O device (s) 306 may include output devices such as one or more of a display, a printer, audio speakers, haptic output device, and so forth. In some implementations, the I/O device(s) 306 may be physically incorporated with the user device 104 or may be externally placed.

The content server 106 may also include one or more network interfaces 308 (e.g., NICs) configured to send and receive communications over the network(s) 102. The content server 106 may also include one or more busses or other internal communications hardware or software that allow for the transfer of data between the various modules and components of the content server 106.

As shown in FIG. 3, the content server 106 includes one or more memories referred to herein as memory 310. The memory 310 comprises one or more CRSM, as described above in FIG. 2. The memory 310 may include at least one OS module 312. The OS module 312 is configured to manage hardware resources such as the I/O interface(s) 304 and provide various services to applications or modules executing on the processor(s) 302.

In some implementations, the memory 310 may include an audio preprocessing module 112 that analyzes an audio portion of the content data 110, extracts low frequency audio data, and generates the haptic control data 114 for controlling the haptic actuator(s) 118. In such implementations, the haptic control data 114 may be generated on the content server 106 prior to the content data 110 being provided to the user device 104. The haptic control data 114 may then be provided to the user device 104 concurrently with or separately from the content data 110. Such implementations are described further herein with reference to FIGS. 12 and 13.

Memory 310 may also include a content provision module 314 that receives the content request 108 from the user device 104, retrieves the requested content from local or external storage, and provides the content data 110 to the user device 104 in response to the content request 108. The content provision module 314 may provide the content data 110 as a file download, a stream, or through other means. In some cases, the content provision module 314 may include functionality for digital rights management, licensing, or content security.

Other modules 316 may also be included in the memory 310. These other modules 316 may include, but are not limited to, user authentication modules, access control modules, digital rights management modules, stored content management modules, and so forth.

The memory 310 also includes a datastore 318 to store information for operations of the content server 106. The datastore 318 may comprise a database, array, structured list, tree, or other data structure. In some implementations, the datastore 318 may store the content data 110 or the haptic control data 114. Other data 320 may also be stored in the datastore 318, such as user account information, network connectivity or performance data, content management data, and so forth.

Figure 4:
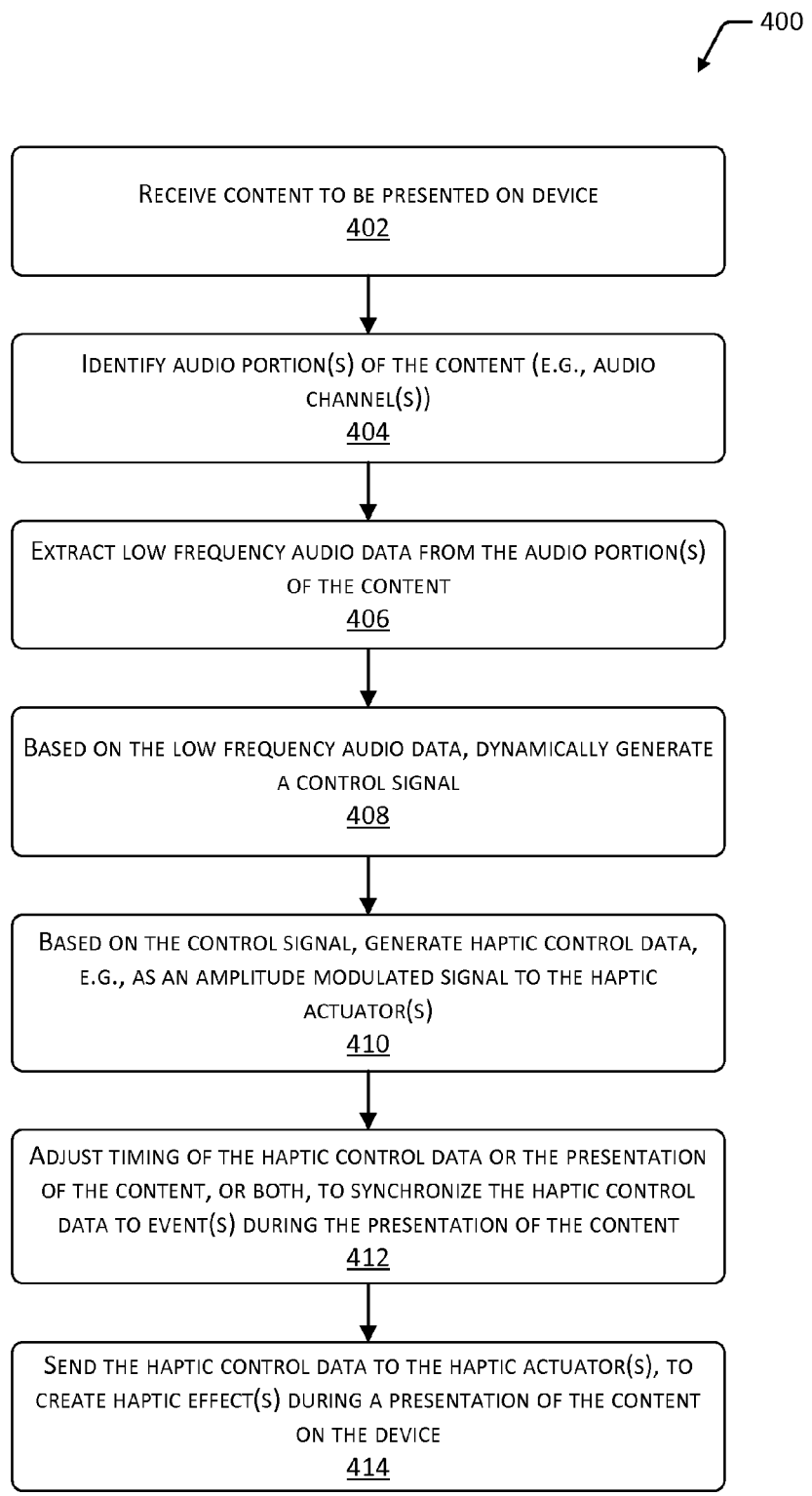
FIG. 4 depicts a flow diagram of a process for dynamically generating haptic effects based on audio data extracted from received content.

FIG. 4 depicts a flow diagram 400 of a process for generating haptic effects 120 based on audio data extracted from received content, according to implementations described herein. The process includes operations that may be performed on the user device 104, the content server 106, or a combination thereof. In some implementations, the operations performed on the user device 104 may be performed at least in part by the audio preprocessing module 112, the haptic controller(s) 116, the processor(s) 202, or any combination of these or other components of the user device 104.

At 402, the content data 110 is received to be presented on the user device 104. The content data 110 may be received as a download or a stream to the user device 104 and may be received from the content server 106 in response to the content request 108. The content data 110 may be an audio file or a multimedia file such as a game or video that includes audio information.

At 404, one or more audio portions of the content data 110 are identified. In some implementations, the received content includes one or more channels of audio information.

At 406, the low frequency audio data is extracted from the audio portion(s) of the content data 110. Extraction of low frequency audio data is described further with reference to FIG. 5.

At 408, a control signal is generated, based at least in part on the extracted low frequency audio data. In some implementations, the control signal is generated by applying an absolute value operation to the low frequency audio data. In some implementations, the control signal generated at 408 is an intermediate control signal that is generated based on the extracted low frequency audio data, and that is used to generate the haptic control data 114 as described below. Generation of the control signal is described further with reference to FIGS. 12 and 13.

At 410, the haptic control data 114 is generated based on the control signal. In some implementations, the haptic control data 114 is an amplitude modulated signal that is provided to the haptic actuators 118 to generate one or more haptic effects. In some cases, generating the haptic control data 114 is based on a mapping of the control signal to the haptic control frequency range (e.g., 100-500 Hz). Various implementations for generating the haptic control data 114 are described further herein with reference to FIGS. 6-11. In some implementations, the haptic control data 114 is generated dynamically as the content data 110 is received at the user device 104. In some implementations, the haptic control data 114 is stored locally on the user device 104 or stored externally, enabling the haptic control data 114 to be reused if the content data 110 is replayed on the user device 104 at a later time.

At 412, one or more timing adjustments may be made to the haptic control data 114 to ensure that the playing of the one or more haptic effects 120 correspond to the presentation of the content data 110 on the user device 104. For example, where the content data 110 is a game or video that includes an event such as an explosion or a collision, implementations may ensure that the haptic effects 120 corresponding to the event are presented with a timing that is synchronized with or that otherwise corresponds to the occurrence of the event during the presentation 122 of the content data 110.

Some implementations may account for various timing factors between the presentation 122 of the content data 110 and the haptic control data 114. Such timing factors may be due to a latency introduced by processing the incoming audio data to generate the haptic control data 114. Moreover, some types of the haptic actuators 118 may have a transient behavior, such that an amount of time elapses between receiving the control signal at the actuator and the time when the triggered haptic effect is generated and perceivable by a user. To account for these and other timing factors, implementations may introduce one or more time delays into the presentation 122 of the content data 110, into the control signal that sends the haptic control data 114 to the haptic actuator(s) 118, or to both the presentation 122 of the content data 110 and the control signal to the haptic actuator(s) 118. Such time delays may be fixed time delays. In some implementations, time delays may be dynamically determined based on the latency introduced by the audio processing operations, or based on the transient behavior of the haptic actuator(s) 118.

In some cases, the input content data 110 may be buffered and its audio portions analyzed, to allow sufficient time to generate the haptic control data 114. Such buffering may be dependent on the type of the content data 110. For example, buffering may not be performed for content types for which an optimal user experience includes maintaining real-time responsiveness to user input, such as where content data 110 is a game. Buffering may be performed in cases where content data 110 is video or audio data.

In some implementations, latency in controlling the haptic actuator(s) 118 may be reduced by bypassing one or more OS functions and controlling the haptic actuator(s) 118 directly from the application layer (e.g., from the audio preprocessing module 112). Moreover, in some cases, latencies may be reduced through the use of one or more predetermined waveforms of the haptic control data 114 that are stored on the user device 104 and sent to the haptic actuator(s) 118 when a haptic effect 120 is desired. For example, one or more predetermined waveforms of the haptic control data 114 may be stored in an audio processor, in the haptic controller(s) 116, or in memory 212, and sent to the haptic actuator(s) 118 based on certain characteristics of the incoming low frequency audio data or certain events in the content data 110.

In some implementations, the haptic effects 120 may be synchronized with the presentation of the multimedia content, to provide a more visceral or realistic experience for the user. For example, in cases where the content data 110 is multimedia content such as a film, television program, or game, events seen in video or graphics may be substantially coincident with the haptic effects 120.

Synchronization of the content playback to the haptic effects 120 may also create a richer listening experience for the user when the content data 110 is audio data such as music. In some cases, user devices 104 such as mobile devices may not have speakers with the ability to play low frequency audio data, such as a subwoofer. Implementations allow the conventional speakers of a user device 104 to be supplemented with haptic actuators 118, so that subwoofer channel audio data is presented to the user through haptic actuators 118 instead of going unpresented.

At 414, the haptic control data 114 is sent to the haptic actuator(s) 118, to instruct the haptic actuator(s) 118 to create one or more haptic effects 120 during a presentation 122 of the content data 110. In some implementations, the haptic control data 114 is provided to the haptic actuator(s) 118 through the haptic controller(s) 116. In other implementations, the haptic control data 114 may be sent directly to the haptic actuator(s) 118 from the audio preprocessing module 112.

In some implementations, the dynamic generation of haptic effects 120 described herein may be turned on or turned off by a user, or configured by the user to operate for certain types of content and not for other types of content. For example, a user may change a setting on the user device 104 to indicate that dynamic haptic effects 120 are to be played for video content but not for game content. Moreover, in some implementations, the dynamic generation of haptic effects 120 may be disabled automatically under certain operating conditions of the user device 104. For example, dynamic generation of haptic effects 120 may be disabled when the user device 104 is operating with low battery, to reduce power consumption.

Figure 5:
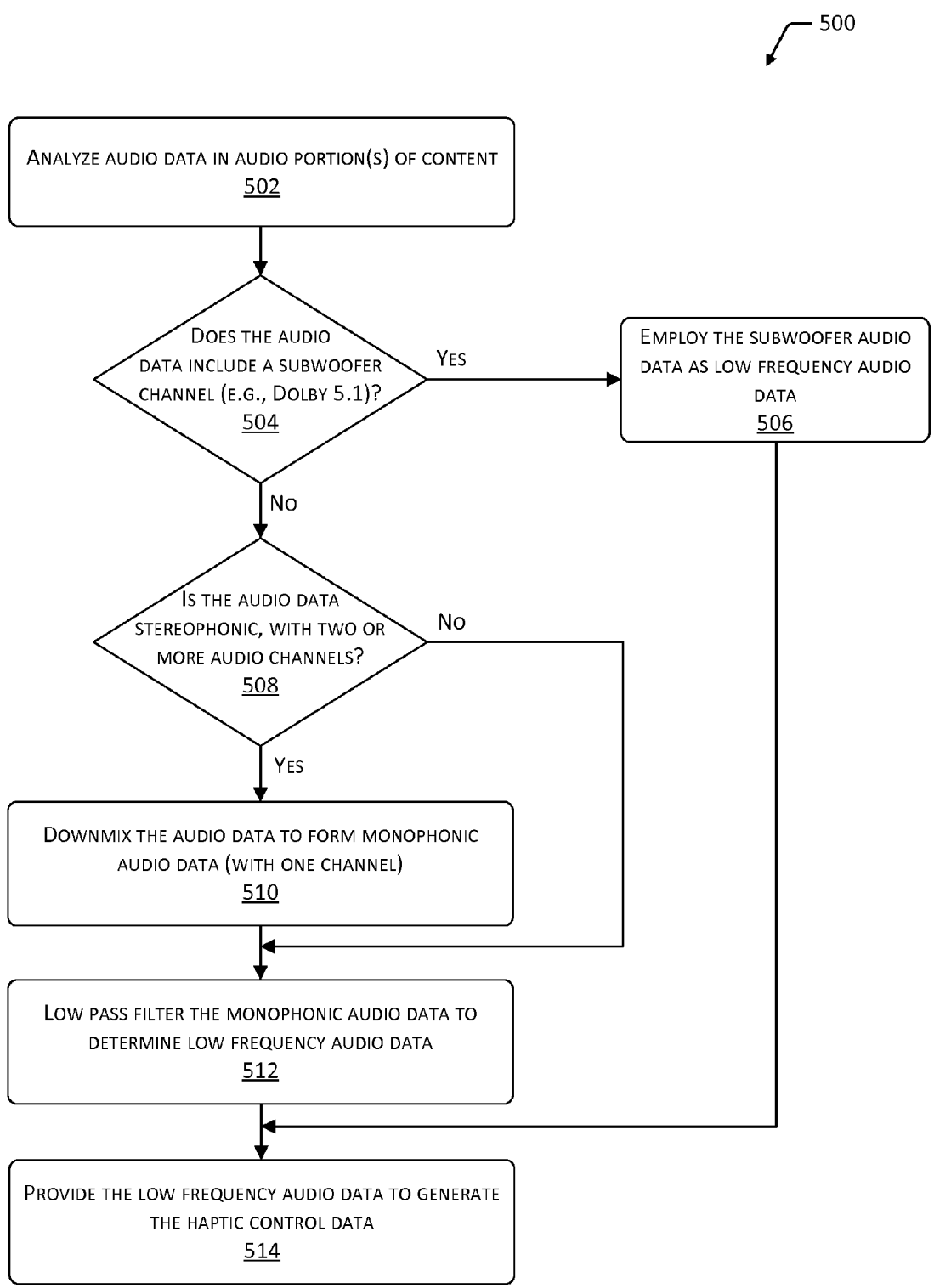
FIG. 5 depicts a flow diagram of a process for extracting low frequency audio data for use in generating haptic effects.

FIG. 5 depicts a flow diagram 500 of a process for extracting low frequency audio data for use in generating haptic effects 120, according to implementations described herein. The process includes operations that may be performed on the user device 104, the content server 106, or on a combination of the user device 104 and the content server 106. In some implementations, the operations performed on the user device 104 may be performed at least in part by the audio preprocessing module 112, the haptic controller(s) 116, the processor(s) 202, or any combination of these or other components of the user device 104. In some implementations, the operations performed on the content server 106 may be performed at least in part by the audio preprocessing module 112, the processor(s) 302, or any combination of these or other components of the content server 106.

At 502, the audio data in one or more audio portions of the content data 110 is analyzed. At 504, a determination is made whether the audio data includes an identified subwoofer channel. For example, where the audio data is in the Dolby Digital® 5.1, 6.1, or 7.1 format developed by Dolby Laboratories, Inc. of San Francisco, Calif., USA, the subwoofer (e.g., "0.1") channel is included as a separate channel. If it is determined that the audio data includes an identified subwoofer channel, at 506, the information from that channel is employed as the low frequency audio data.

If it is determined at 504 that the audio data does not include a subwoofer channel, then at 508, a determination is made whether the audio data is stereophonic, having two or more audio channels. If so, then at 510, the audio data is downmixed to be monophonic, such that the multiple channels are mixed into one audio channel. If it is determined at 508 that the audio data is not stereophonic, 510 may be bypassed.

At 512, a low pass filter may be applied to the monophonic audio data (or to the downmixed stereophonic audio data). This low pass filter may filter out the audio data below a particular threshold frequency, such as below 90 Hz, to extract low frequency audio data. The low pass filtering may employ a digital low pass filter or an analog low pass filter, based on whether the input audio data is digital or analog. At 514, the low frequency audio data is provided to generate the haptic control data 114.

Figure 6:
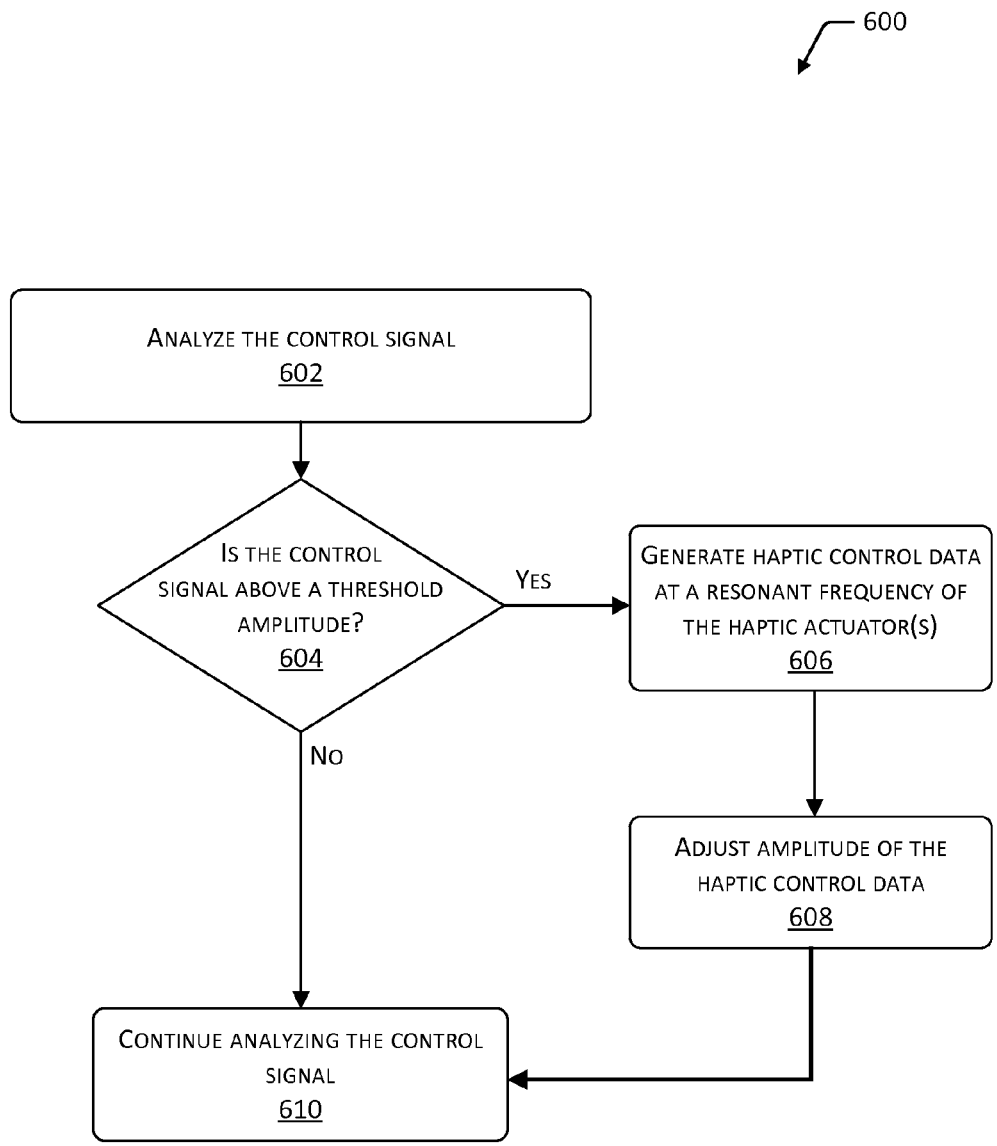
FIG. 6 depicts a flow diagram of a process for generating haptic control data at a resonant frequency of one or more haptic actuators.

FIG. 6 depicts a flow diagram 600 of a process for generating haptic control data 114 at a resonant frequency of one or more haptic actuators 118, according to implementations described herein. The process includes operations that may be performed on the user device 104, the content server 106, or on a combination of the user device 104 and the content server 106. In some implementations, the operations performed on the user device 104 may be performed at least in part by the audio preprocessing module 112, the haptic controller(s) 116, the processor(s) 202, or any combination of these or other components of the user device 104. In some implementations, the operations performed on the content server 106 may be performed at least in part by the audio preprocessing module 112, the processor(s) 302, or any combination of these or other components of the content server 106.

At 602, the control signal (e.g., the control signal generated at 408) is analyzed. At 604, a determination is made whether the amplitude of the control signal is above a threshold amplitude. If so, at 606, the haptic control data 114 is generated at the resonant or center frequency of the haptic actuator(s) 118.

At 608, in some implementations, the amplitude of the haptic control data 114 may be adjusted to be proportional to the amplitude of the control signal. In some implementations, this amplitude adjustment may be performed through application of a multiplicative constant K, such that the amplitude of the output haptic control data 114 is K times the amplitude of the control signal. In some implementations, the amplitude adjustment may be a function of frequency $K(f_1, f_2)$, such that the amplitude of the output haptic control data 114 at a particular frequency $f_2$ is $K(f_1, f_2)$ times the amplitude of the control signal at a particular frequency $f_1$. In some implementations, the amplitude adjustment is performed by the haptic controller(s) 116 on the user device 104. In some implementations, the amplitude adjustment factor K or function $K(f_1, f_2)$ may be based on a particular type or characteristic of the haptic actuator(s) 118.

At 610, analysis of the control signal may continue. If the determination at 604 is negative, the process may proceed to 610 and continue analyzing the incoming control signal.

In the implementation illustrated in FIG. 6, the haptic control data 114 is generated as an amplitude modulated signal with a frequency corresponding to the resonant or center frequency of the haptic actuator(s) 118, e.g. at the frequency where the haptic actuator(s) 118 is most responsive. In such implementations, the haptic actuator(s) 118 is triggered in response to a haptic control signal that is above a threshold amplitude.

Various threshold amplitudes may be used in various implementations. In some implementations, the threshold amplitude may be zero, such that any control signal triggers a haptic effect 120. In some implementations, the threshold amplitude may be set to be greater than zero. Such implementations may reduce power consumption of the user device 104, by providing that the control signal surpasses a particular threshold amplitude before haptic effects 120 are triggered. In some cases, the threshold may be adjusted dynamically based on a power state of the user device 104 (e.g., a charge state of the battery, whether the user device 104 is operating on battery power, or whether the user device 104 is plugged into a power source). For example, when the user device 104 is operating with an almost exhausted battery, the threshold amplitude may be increased to reduce power consumption resulting from the frequent activation of the one or more haptic actuators 118. Similarly, the amplitude of the haptic output may be reduced to conserve power. In some implementations, the threshold may be adjusted based on user input, to enable a user to tailor their user experience to have more or fewer haptic effects 120 while consuming content.

Figure 7:
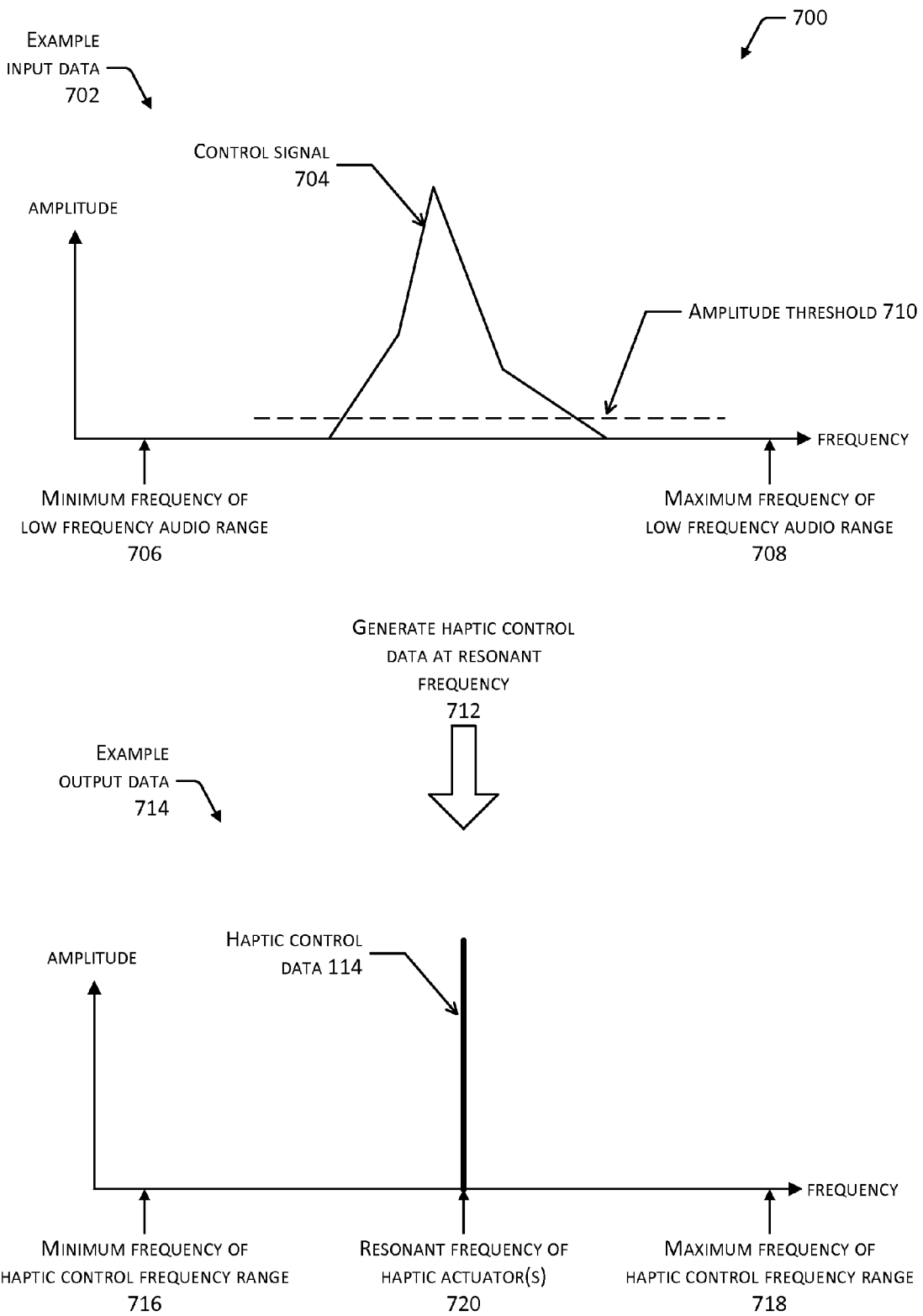
FIG. 7 depicts graphs of an example waveform for an input control signal, and an example waveform for output haptic control data at a resonant frequency of one or more haptic actuators.

FIG. 7 depicts graphs 700 of an example input data 702 for an input control signal 704 and an example output data 714 for output haptic control data 114. In both graphs 700, frequency is along the horizontal axis and amplitude is along the vertical axis. FIG. 7 depicts the implementation in which the output haptic control data 114 is generated as shown in FIG. 6 at a resonant frequency of the haptic actuator(s) 118. The control signal 704 is shown as an example waveform, with the amplitude varying between a minimum frequency 706 and maximum frequency 708 of a low frequency audio range (e.g., 20-80 Hz).

In some implementations, the portion of the control signal 704 that is above an amplitude threshold 710 may be employed as input to an operation 712 to generate the haptic control data 114. Example output data 714 is illustrated as an example waveform between a minimum frequency 716 and a maximum frequency 718 of the haptic control frequency range. In the implementation illustrated in FIG. 7, the haptic control data 114 is generated as mono-frequency signal at the resonant frequency 720 of the haptic actuator(s) 118, e.g. at the frequency where the haptic actuator(s) 118 is most responsive. Thus, if control signal 704 is above the amplitude threshold 710, the haptic actuator(s) 118 is triggered at the resonant frequency 720. The implementations illustrated by FIGS. 6 and 7 may be employed in cases where the haptic actuator(s) 118 have a high Q value, such that their response curve is highly peaked at the resonant frequency 720 and falls off rapidly at frequencies farther from the resonant frequency 720.

Figure 8:
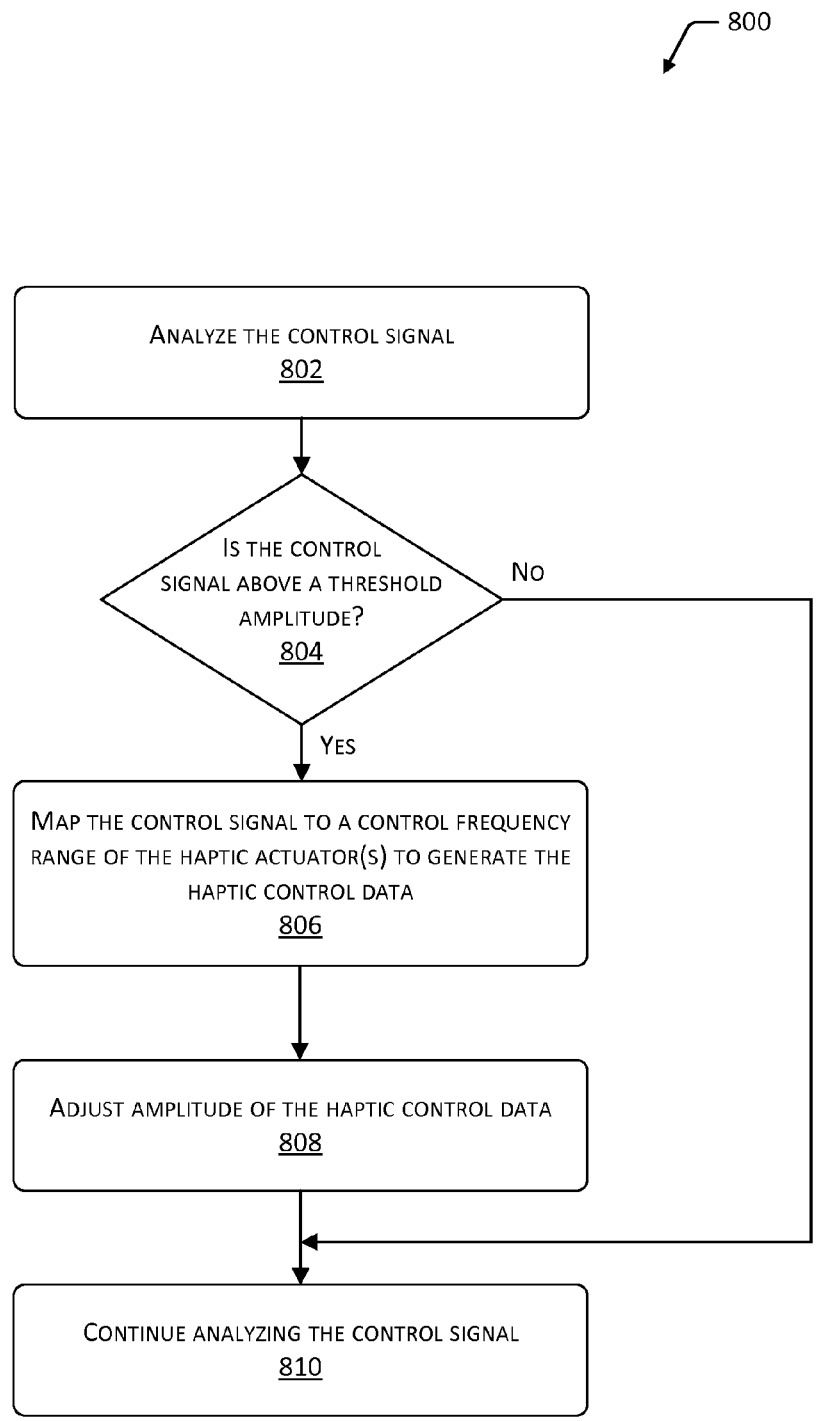
FIG. 8 depicts a flow diagram of a process for generating haptic control data by mapping an input control signal associated with low frequency audio data into a control frequency range of one or more haptic actuators.

FIG. 8 depicts a flow diagram 800 of a process for generating the haptic control data 114 by mapping the control signal 704 to a control frequency range of one or more haptic actuators 118, according to implementations described herein. The process includes operations that may be performed on the user device 104, the content server 106, or on a combination of the user device 104 and the content server 106. In some implementations, the operations performed on the user device 104 may be performed at least in part by the audio preprocessing module 112, the haptic controller(s) 116, the processor(s) 202, or any combination of these or other components of the user device 104. In some implementations, the operations performed on the content server 106 may be performed at least in part by the audio preprocessing module 112, the processor(s) 302, or any combination of these or other components of the content server 106.

At 802, the control signal 704 is analyzed. At 804, a determination is made whether the amplitude of the control signal 704 is above a threshold amplitude. If so, at 806 the haptic control data 114 is generated by mapping the control signal to the control frequency range of the haptic actuator(s) 118, to generate the haptic control data 114. At 808, in some implementations, an amplitude of the haptic control data 114 may be adjusted as described above with regard to 608.

At 810, analysis of the control signal continues. If the determination at 804 is negative, the process may proceed to 810 and continue analyzing the incoming control signal 704.

In the implementation illustrated in FIG. 8, the mapping may include any function that accepts the control signal 704 as input and produces the haptic control data 114 as output. For example, the function may be linear, such that the control signal 704 is mapped to the control frequency range of the haptic actuator(s) 118, by multiplying the control signal 704 by a factor of C (e.g., C=5), or by a certain number of octaves (e.g., 3 to 5).

Figure 9:
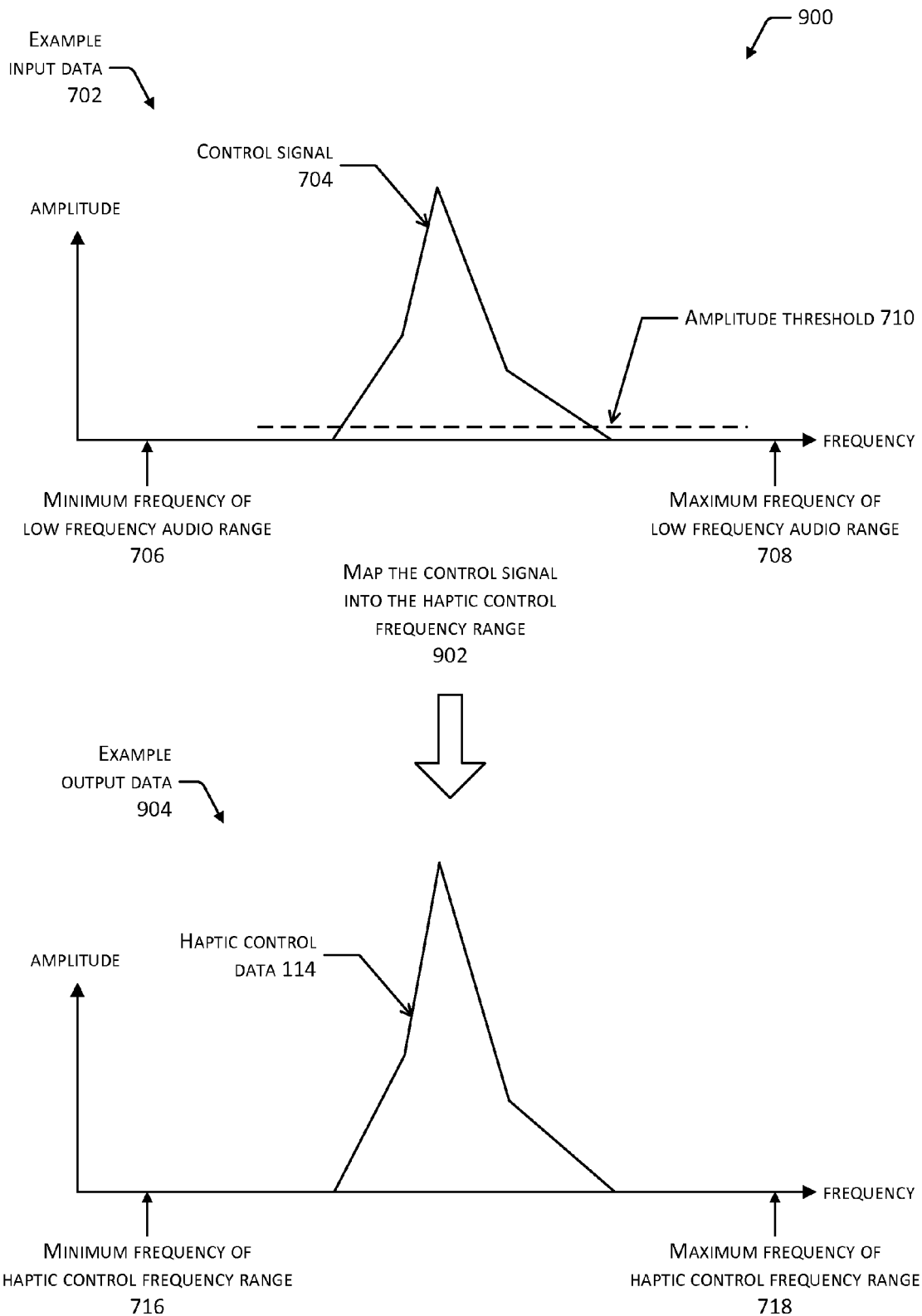
FIG. 9 depicts graphs of an example waveform for an input control signal, and an example waveform for output haptic control data that is mapped from the input low frequency audio data.

FIG. 9 depicts graphs 900 of an example input data 702 for the control signal 704 and an example output data 904 for the output haptic control data 114. In both graphs 900, frequency is along the horizontal axis and amplitude is along the vertical axis. FIG. 9 illustrates implementations in which the output haptic control data 114 is generated as shown in FIG. 8 through a functional mapping of the control signal 704 to the control frequency range of the haptic actuator(s) 118. As in FIG. 7, the control signal 704 is shown as an example waveform, varying between a minimum frequency 706 and maximum frequency 708 of a low frequency audio range (e.g., 20-80 Hz).

In some implementations, portions of the control signal 704 that are above an amplitude threshold 710 may be employed as input to an operation 902 to map the control signal into the haptic frequency range. Example output data 904 is illustrated as an example waveform between a minimum frequency 716 and a maximum frequency 718 of the haptic control frequency range. In the implementation illustrated in FIG. 9, the haptic control data 114 is generated by linearly mapping (e.g., through a multiplicative constant) the control signal 704 into the control frequency range of the haptic actuator(s) 118. The implementation illustrated by FIGS. 8 and 9 may be employed in cases where the haptic actuator(s) 118 have a lower Q value, such that their response curve is flatter across the haptic control frequency range than in the example of FIG. 7. Although FIG. 9 illustrates an example of a linear mapping, implementations are not so limited and other types of mappings may be employed.

Figure 10:
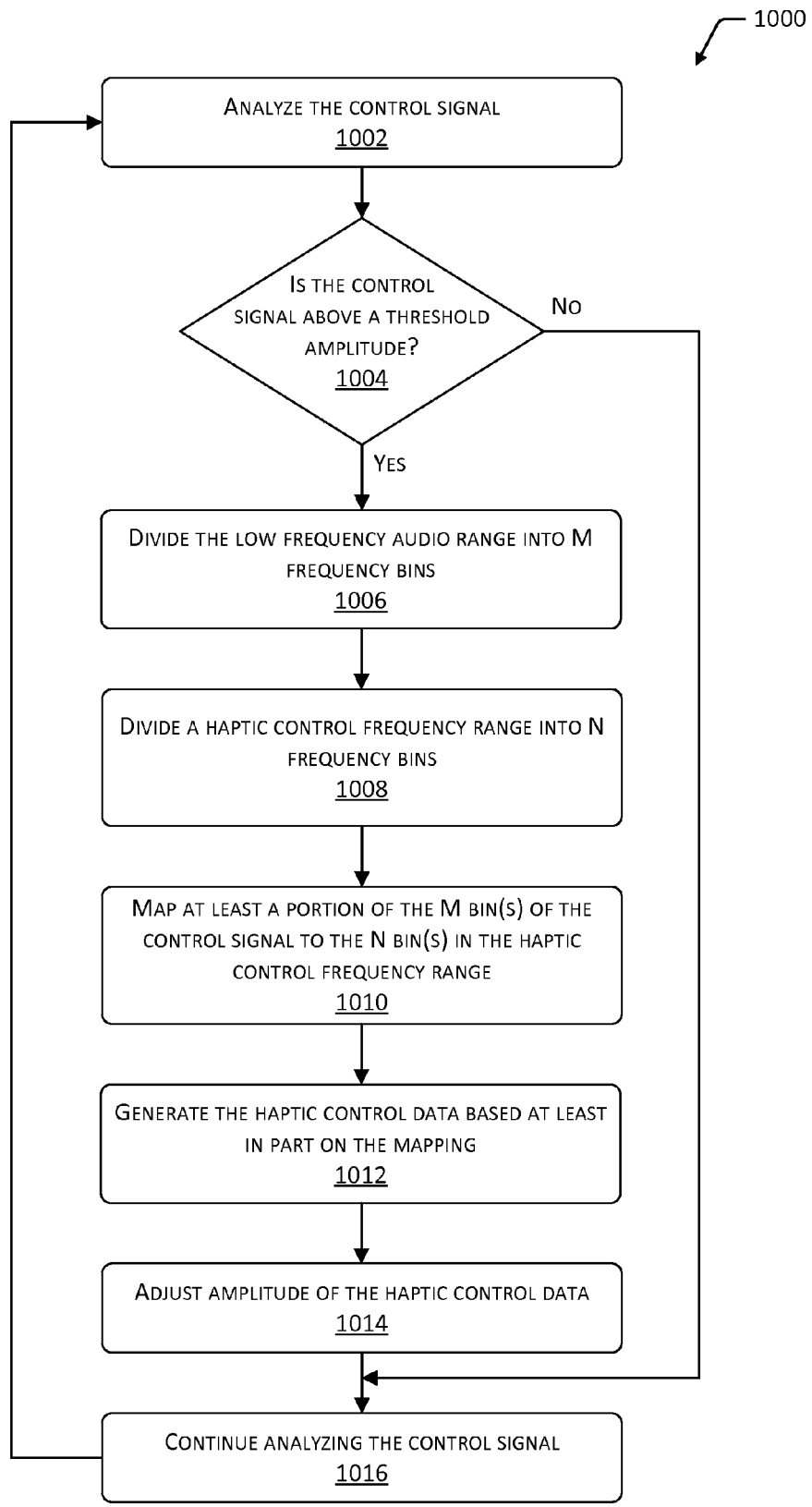
FIG. 10 depicts a flow diagram of a process for generating haptic control data by mapping an input control signal associated with multiple frequency bins of low frequency audio data into corresponding frequency bins of a control frequency range of one or more haptic actuators.

FIG. 10 depicts a flow diagram 1000 of a process for generating the haptic control data 114 by mapping M frequency bins of the control signal 704 into N frequency bins of a control frequency range of the one or more haptic actuators 118, according to implementations described herein. The process includes operations that may be performed on the user device 104, the content server 106, or on a combination of the user device 104 and the content server 106. In some implementations, the operations performed on the user device 104 may be performed at least in part by the audio preprocessing module 112, the haptic controller(s) 116, the processor(s) 202, or any combination of these or other components of the user device 104. In some implementations, the operations performed on the content server 106 may be performed at least in part by the audio preprocessing module 112, the processor(s) 302, or any combination of these or other components of the content server 106.

At 1002, the control signal 704 is analyzed. At 1004, a determination is made whether the amplitude of the control signal 704 is above a threshold amplitude. If so, at 1006, the low frequency audio range may be divided into M frequency bins (e.g., sub-ranges), and at 1008, the control frequency range of the haptic actuator(s) 118 may be divided into N frequency bins. At 1010, portion(s) of the control signal 704 in one or more of the M frequency bins of the low frequency audio range may be mapped to one or more corresponding N frequency bins in the control frequency range of the haptic actuator(s) 118. At 1012, the haptic control data 114 is generated based at least in part on the mapping. At 1014, an amplitude of the haptic control data 114 may be adjusted as described above with reference to 608.

At 1016, analysis of the control signal 704 continues. If the determination at 1004 is negative, the process may proceed to 1016 and continue with analysis of the control signal 704.

Implementations may employ any number for M and N. In some implementations, M equals N. In other implementations, M is different from N. In some implementations, M and N both equal 4. In some cases, there may be a one-to-one mapping between the M bins and the N bins. In other cases, there may be a many-to-one or one-to-many mapping between the M bins and the N bins. In some implementations, the number of bins may be tuned based on performance characteristics of the user device 104. For example, higher performing user devices 104 may employ a higher number of bins to provide for a greater fidelity in mapping the control signal 704 to the haptic control data 114.

In some implementations, the various frequencies of the haptic control data 114 in the various N frequency bins may be sent to one haptic actuator 118 to cause that haptic actuator 118 to generate the haptic effect(s) 120. In some implementations, each of the various frequencies of the haptic control data 114 in the various N frequency bins may be sent to a different one of the haptic actuators 118. In such cases, the haptic actuator 118 that receives haptic control data 114 corresponding to a frequency bin may have a resonant frequency that is substantially centered on, or that is otherwise included in, the haptic control frequency range spanned by the frequency bin.

Figure 11:
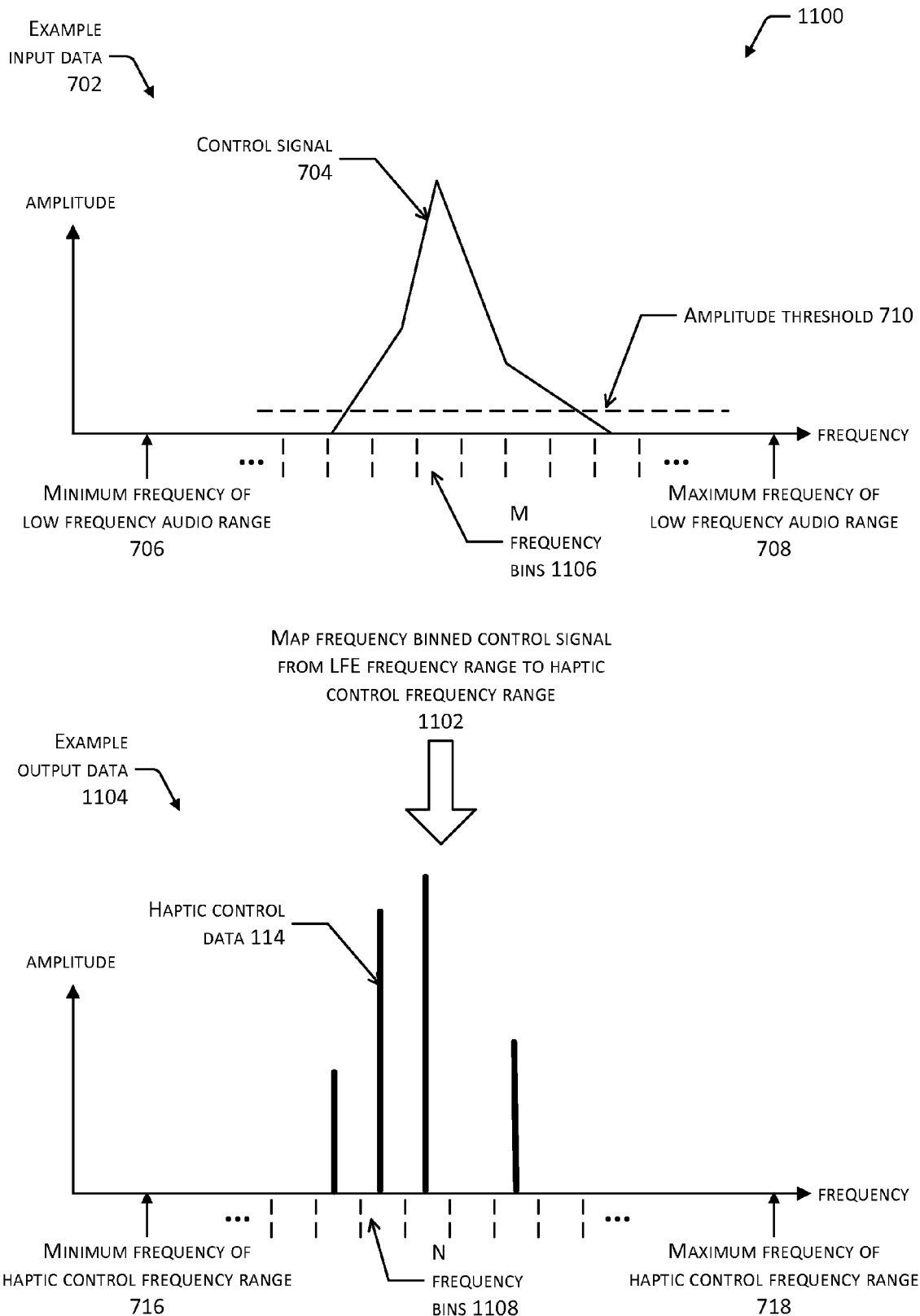
FIG. 11 depicts graphs of an example waveform for an input control signal, and an example waveform for output haptic control data that is mapped from the input control signal using multiple frequency bins.

FIG. 11 depicts graphs 1100 of an example input data 702 for the input control signal 704 and an example output data 1104 for output haptic control data 114. In both graphs 1100, frequency is along the horizontal axis and amplitude is along the vertical axis. FIG. 11 depicts the implementation in which the output haptic control data 114 is generated as shown in FIG. 10 through a binned mapping of the control signal 704 into the control frequency range of the haptic actuator(s) 118. As in FIG. 7, the control signal 704 is shown as an example waveform, varying between a minimum frequency 706 and maximum frequency 708 of a low frequency audio range (e.g., 20-80 Hz).

In some implementations, portions of the control signal 704 that are above an amplitude threshold 710 may be employed as input to an operation 1102 to generate the haptic control data 114. Example output data 1104 is illustrated as an example waveform between a minimum frequency 716 and a maximum frequency 718 of the haptic control frequency range.

In the implementation illustrated in FIG. 11, the haptic control data 114 is generated through a bin-wise mapping of the control signal 704 into the control frequency range of the haptic actuator(s) 118. For example, the low frequency audio range may be divided into M frequency bins 1106 of varying or equal widths, and the control frequency range of the haptic actuators 118 may be divided into N frequency bins 1108 of varying or equal widths. The portions of the control signal 704 in each of the M frequency bins 1106 may be employed to generate the haptic control data 114 in one or more of the N frequency bins 1108. In some implementations, processing of each bin of the control signal 704 may proceed as described above with regard to FIGS. 6 and 7, to generate an amplitude-modulated waveform with a frequency that is at the center frequency of one of the N frequency bins 1108.

In the implementation of FIGS. 10 and 11, the M bins for the low frequency audio range are sub-ranges that span the low frequency audio range, and the N bins for the haptic control frequency range of the haptic actuator(s) 118 are sub-ranges that span the haptic control frequency range. In the example shown, the bins are of equal width. However, implementations are not so limited. In some cases, the bins may be of varying width. For example, in cases where the haptic actuator(s) 118 have a high Q value, the bins of the haptic control frequency range may be wider closer to the resonant frequency. In cases where the haptic actuator(s) 118 have a lower Q value, the bins of the haptic control frequency range may have a more uniform width. In some cases, the bin-wise mapping described herein may employ a FFT or other transform algorithm.

FIG. 12 depicts a flow diagram 1200 of a process for generating the control signal 704 to be employed to generate the haptic effect(s) 120 based on low frequency audio data. The process includes operations that may be performed on the user device 104, the content server 106, or on a combination of the user device 104 and the content server 106. In some implementations, the operations performed on the user device 104 may be performed at least in part by the audio preprocessing module 112, the haptic controller(s) 116, the processor(s) 202, or any combination of these or other components of the user device 104. In some implementations, the operations performed on the content server 106 may be performed at least in part by the audio preprocessing module 112, the processor(s) 302, or any combination of these or other components of the content server 106.

Figure 13:
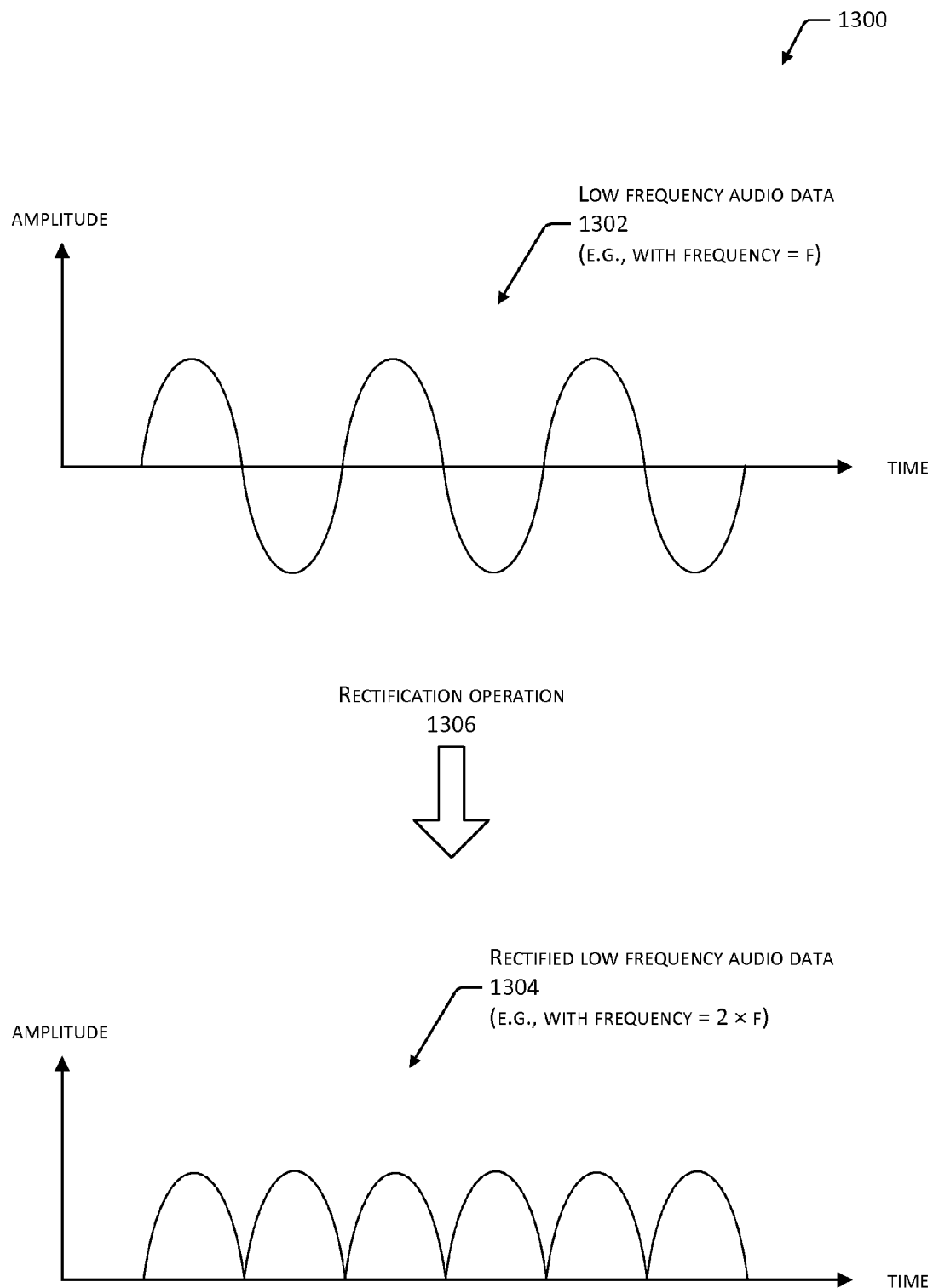
FIG. 13 depicts graphs of example waveforms for input low frequency audio data and rectified low frequency audio data for generating a haptic control signal.

At 1202, a rectification on the low frequency audio data is performed. This may be an active, full wave rectification of the low frequency audio data. An example of an active, full wave rectification is shown in FIG. 13, which depicts time versus amplitude graphs 1300 of example waveforms for input low frequency audio data 1302 and rectified low frequency audio data 1304 generated through a rectification operation 1306. In the example waveforms of FIG. 13, the low frequency audio data 1302 is depicted as having a single component that is a sine waveform of a particular frequency f. In some cases, the low frequency audio data 1302 may be a more complex waveform, having multiple components of various frequencies in the low frequency audio range.

Because the rectification operation 1306 transforms the negative portions of the waveform of the low frequency audio data 1302 to positive portions in the output waveform of the rectified low frequency audio data 1304, the rectification operation 1306 effectively doubles each frequency in the frequency spectrum of the low frequency audio data 1302. For example, where the low frequency audio data 1302 is in a low frequency audio range of 20-80 Hz, the rectification operation 1306 may frequency-shift the signal into a range of 40-160 Hz. In cases where the low frequency audio data 1302 is an analog signal, the rectification operation 1306 may be performed using analog signal processing techniques. In cases where the low frequency audio data 1302 is a digital signal, a mathematically similar digital operation may be performed to rectify the signal.

The active, full wave rectification operation at 1202 introduces various higher frequency components into the frequency spectrum of the rectified low frequency audio data 1304, such as harmonic thirds, fifths, and so forth. In some implementations, at 1204 one or more filtering operations may be applied to at least partly remove or suppress those higher frequency components and to tailor the rectified low frequency audio data 1304 to have a waveform that is closer to a sine wave. In some implementations where the haptic actuator(s) 118 have a limited response to such higher frequency components, the filtering operations at 1204 may not be performed.

In some implementations, the rectified low frequency audio data 1304 may be employed as the control signal 704 without further processing and sent to the haptic controller(s) 116 or the haptic actuator(s) 118 to generate haptic effect(s) 120. For example, in implementations where the haptic actuator(s) 118 have a haptic control frequency range that at least partly overlaps with the frequency range (e.g., 40-160 Hz) of the rectified low frequency audio data 1304, employing the rectified low frequency audio data 1304 as the control signal 704 may lead to a perceivable haptic effect 120 generated from the haptic actuator(s) 118.

In some implementations, at 1206, one or more additional signal processing operation(s) may be performed to frequency-shift the rectified low frequency audio data 1304 into the haptic control frequency range of the haptic actuator(s) 118. In some cases, this may include modifying the rectified low frequency audio data 1304 through one or more band-pass filtering operations, such that its frequency spectrum is substantially centered at the resonant frequency 720 of the haptic actuator(s) 118. For example, band-pass filtering operations may be employed to shift the frequency spectrum of the rectified low frequency audio data 1304 from a range of 20-80 Hz to a range of 60-250 Hz, in cases where the resonant frequency 720 is 155 Hz. Such shifting may be performed through the various methods described above with reference to FIGS. 6-11 or through other methods.

Figure 14:
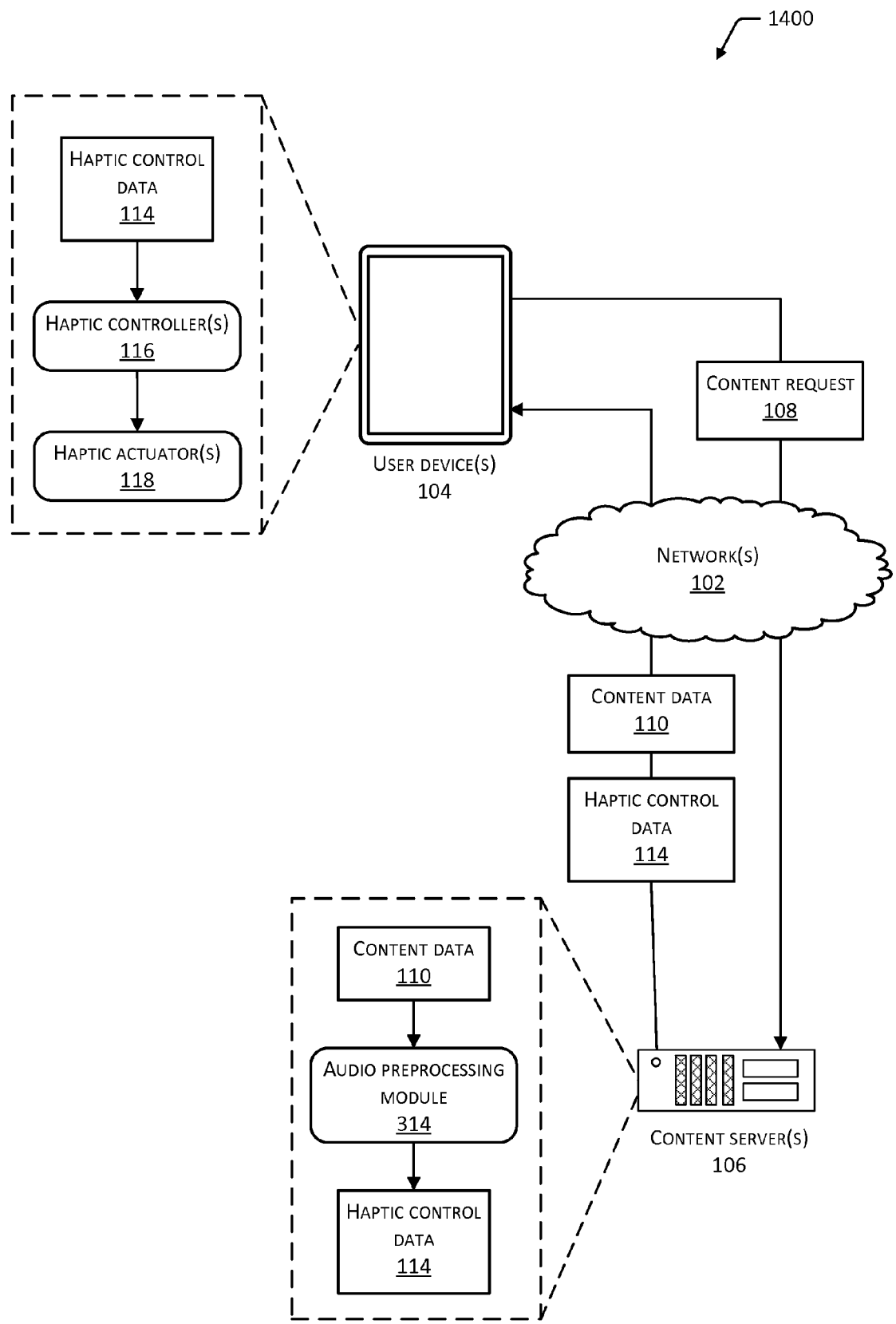
FIG. 14 depicts an environment for generating haptic effects for content on a content server by analyzing audio data associated with the content.

FIG. 14 depicts an environment 1400 for generating haptic effects 120 for content on the content server 106 by analyzing audio data associated with the content. Environment 1400 may support implementations in which processing of audio data is performed on the content server(s) 106 to determine the haptic control data 114. In the example shown, the content data 110 is provided to the audio preprocessing module 112 executing on the content server(s) 106, and the haptic control data 114 is generated. In this case, the haptic control data 114 may be stored in memory on the content server(s) 106 or on a device accessible to the content server(s) 106.

On receiving the content request 108 from the user device(s) 104, the content server(s) 106 may provide the content data 110 and the haptic control data 114. In some cases, the content data 110 and the haptic control data 114 may be provided to the user device(s) 104 as separate files or streams, at the same time or at different times. In some implementations, the content data 110 and the haptic control data 114 may be provided within a same file or stream. For example, the haptic control data 114 may be provided as a separate channel within the content data 110.

On receiving the content data 110 and the haptic control data 114, the user device(s) 104 may provide the haptic control data 114 as input to the haptic controller(s) 116. The haptic controller(s) 116 may then provide the haptic control data 114 as a control signal 704 to drive the haptic actuator(s) 118, which generate haptic effects 120 while the content data 110 is being presented on the user device(s) 104. This process is described further with reference to FIG. 15.

Figure 15:
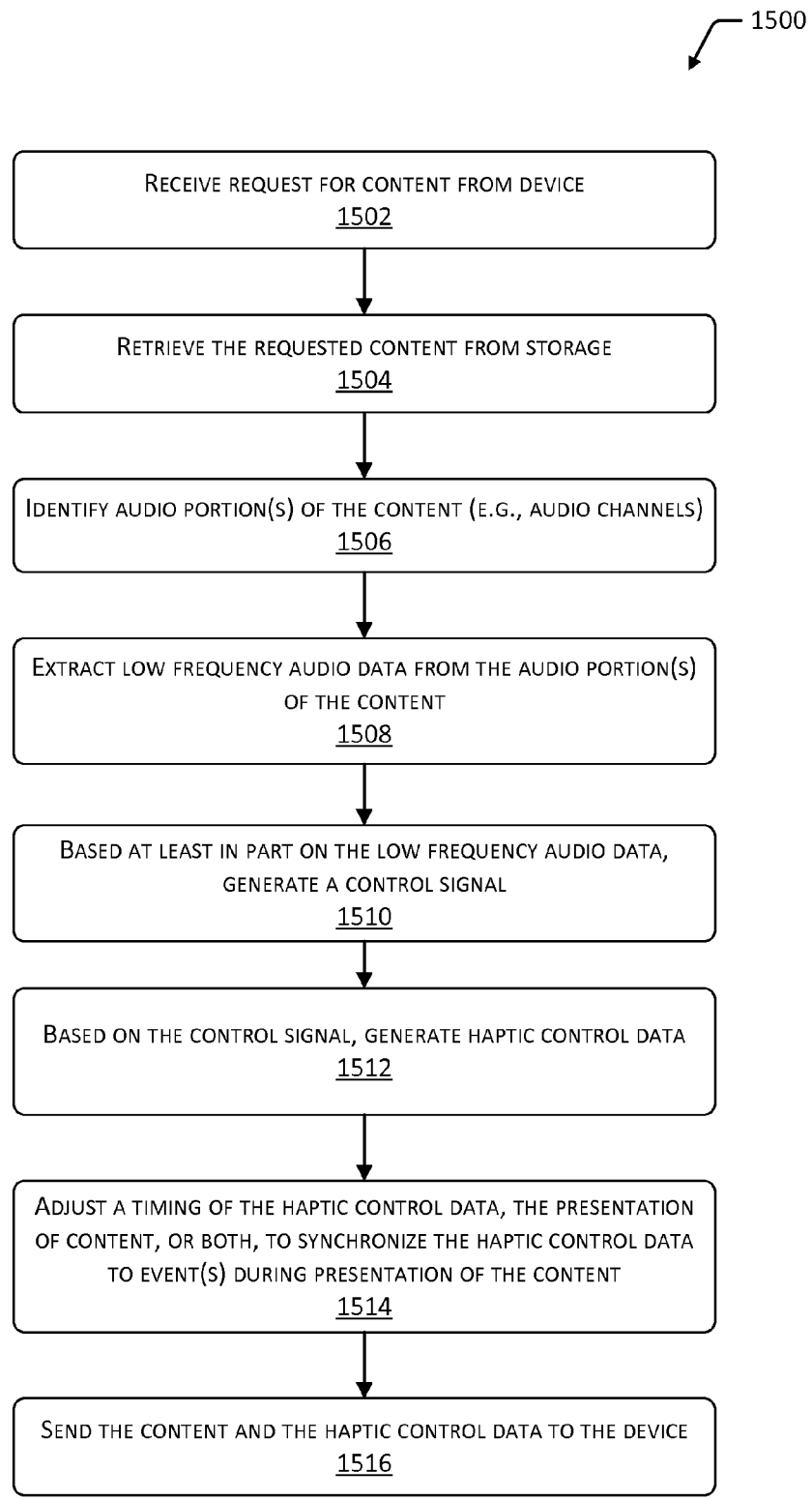
FIG. 15 depicts a flow diagram of a process for generating haptic control data on a content server by analyzing audio data associated with the content.

FIG. 15 depicts a flow diagram 1500 of a process for generating the haptic control data 114 on the content server 106 by analyzing audio data associated with the content, according to implementations described herein. The process includes operations that may be performed on the content server 106. In some implementations, the operations performed on the content server 106 may be performed at least in part by the audio preprocessing module 112, the processor(s) 302, or any combination of these or other components of the content server 106.

At 1502, a content request 108 is received from the user device 104 for one or more items of content. At 1504, the requested item(s) of content may be retrieved from storage on the content server 106 or from storage on a device that is accessible to the content server 106. In some cases where the content is not stored as a complete file and is being received as a live stream to the content server 106, retrieval of the content may include redirecting the stream to the requesting user device 104 while the audio preprocessing and haptic control data generation is performed on the content server 106.

At 1506, one or more audio portion(s) may be identified for the requested content and at 1508, the low frequency audio data may be determined based on the identified audio portion(s). In some implementations, determination of the low frequency audio data may proceed as described above with reference to FIG. 5. At 1510, a control signal 704 may be generated based on the low frequency audio data, as described above. At 1512, the haptic control data 114 may be generated based on the control signal 704, as described above. At 1514, the timing of the haptic control data 114, the presentation 122 of the content data 110, or the timing of both the haptic control data 114 and the presentation 122 of the content data 110 may be adjusted, as described above.

At 1516, the content data 110 and the haptic control data 114 may be sent to the user device 104, in response to the content request 108. In some implementations, the generated haptic control data 114 may be stored on the content server 106 or on an external device accessible to the content server 106, and sent in response to subsequent requests for the content data 110.

Those having ordinary skill in the art will readily recognize that certain steps or operations illustrated in the figures above can be eliminated, combined, subdivided, executed in parallel, or taken in an alternate order. Moreover, the methods described above may be implemented as one or more software programs for a computer system and are encoded in a computer-readable storage medium as instructions executable on one or more processors.

Separate instances of these programs can be executed on or distributed across separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art, and it is intended that the present disclosure encompass such changes and modifications that fall within the scope of the appended claims.

What is claimed is:

1. A system comprising:
    at least one non-transitory computer-readable memory device storing computer-executable instructions; and at least one hardware processor configured to access the at least one memory and execute the computer-executable instructions to:
    receive content including at least one audio channel;
    determine low frequency effects (LFE) audio data from the at least one audio channel, wherein the LFE audio data includes a first frequency range;
    based on the LFE audio data, generate a haptic control signal by mapping the first frequency range to a second frequency range corresponding to at least one haptic actuator; and
    send the haptic control signal to the at least one haptic actuator, enabling the at least one haptic actuator to create at least one haptic effect based on the second frequency range and corresponding to a presentation of the content.

2. The system of claim 1, the instructions further configured to adjust an amplitude of the haptic control signal prior to sending the haptic control signal to the at least one haptic actuator, such that the amplitude of the haptic control signal is proportional to an incoming amplitude of the LFE audio data.

3. The system of claim 1, the instructions further configured to adjust one or more of a timing of the haptic control signal or the presentation of the content, to substantially synchronize the at least one haptic effect with the presentation of the content.

4. The system of claim 1, wherein the content includes digital content data, and the instructions are further configured to perform a digital to analog conversion of the digital content data.

5. A computer-implemented method, comprising:
determining low frequency audio data based on content data, the low frequency audio data corresponding to sound in a first frequency range;
generating haptic control data in a second frequency range to control at least one haptic actuator in a device, wherein the second frequency range corresponds to the first frequency range of the low frequency audio data; and
sending the haptic control data to the at least one haptic actuator to create at least one haptic effect based on the second frequency range and corresponding with a presentation of the content data on the device.

6. The method of claim 5, wherein the content data includes one or more of audio content data, video content data, or game content data.

7. The method of claim 5, wherein the determining the low frequency audio data based on the content data includes:
identifying a subwoofer channel of the content data as including the low frequency audio data.

8. The method of claim 5, wherein the determining the low frequency audio data based on the content data includes applying a low pass filter to an audio portion of the content data.

9. The method of claim 5, wherein the generating the haptic control data includes mapping the low frequency audio data from the first frequency range to the second frequency range.

10. The method of claim 5, wherein the generating the haptic control data includes:
mapping the low frequency audio data from each of a first set of M frequency ranges to at least one corresponding range in a second set of N frequency ranges, wherein the first set of M frequency ranges at least partly spans the first frequency range, and wherein the second set of N frequency ranges at least partly spans the second frequency range.

11. The method of claim 10, wherein M=N, and wherein the mapping is a one-to-one mapping from each of the first set of M frequency ranges to one corresponding range in the second set of N frequency ranges.

12. The method of claim 5, further comprising adjusting an amplitude of the haptic control data prior to sending the haptic control data to the at least one haptic actuator, such that the amplitude of the haptic control data is proportional to an incoming amplitude of the low frequency audio data.

13. The method of claim 5, further comprising adjusting one or more of a timing of the haptic control data or the presentation of the content data, such that the sending of the haptic control data corresponds to the presentation of the content data.

14. The method of claim 5, wherein the generating the haptic control data further includes performing an active, full wave rectification on the low frequency audio data, and wherein the active, full wave rectification modifies a frequency of the low frequency audio data from the first frequency range to the second frequency range to form the haptic control data.

15. A system comprising:
at least one non-transitory computer-readable memory device storing computer-executable instructions; and at least one hardware processor configured to access the at least one memory and execute the computer-executable instructions to:
determine low frequency audio data based on content data, wherein the low frequency audio data corresponds to a first frequency range;
based at least partly on the first frequency range of low frequency audio data, generate haptic control data corresponding to a second frequency range associated with at least one haptic controller; and
send the haptic control data to the at least one haptic controller to drive the at least one haptic actuator during a presentation of the content data.

16. The system of claim 15, wherein the first frequency range is lower than the second frequency range.

17. The system of claim 15, wherein the instructions are further configured to generate the haptic control data by mapping the low frequency audio data from the first frequency range to the second frequency range.

18. The system of claim 15, wherein the instructions are further configured to:
generate the haptic control data by mapping the low frequency audio data from at least one of a first set of M frequency ranges to at least one corresponding range in a second set of N frequency ranges, wherein the first set of M frequency ranges at least partly spans the first frequency range, and wherein the second set of N frequency ranges at least partly spans the second frequency range; and
send the haptic control data by:
generating a first haptic control signal based on a first portion of the second set of N frequency ranges;
sending the first haptic control signal to a first haptic actuator;
generating a second haptic control signal based on a second portion of the second set of N frequency ranges; and
sending the second haptic control signal to a second haptic actuator.

19. The method of claim 10, wherein sending the haptic control data to the at least one haptic actuator includes:
generating a first haptic control signal based on a first portion of the second set of N frequency ranges;
sending the first haptic control signal to a first haptic actuator;
generating a second haptic control signal based on a second portion of the second set of N frequency ranges; and
sending the second haptic control signal to a second haptic actuator.

20. The system of claim 15, wherein the instructions are further configured to generate the haptic control data by performing a rectification operation on the low frequency audio data to modify a frequency of the low frequency audio data from the first frequency range to the second frequency range.

* * * * *